(12) United States Patent
Mochikawa et al.

(10) Patent No.: US 7,724,556 B2
(45) Date of Patent: May 25, 2010

(54) POWER CONVERTER

(75) Inventors: Hiroshi Mochikawa, Tokyo (JP); Tateo Koyama, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 367 days.

(21) Appl. No.: 11/719,359

(22) PCT Filed: Nov. 15, 2005

(86) PCT No.: PCT/JP2005/021320

§ 371 (c)(1),
(2), (4) Date: Aug. 14, 2007

(87) PCT Pub. No.: WO2006/052032

PCT Pub. Date: May 18, 2006

(65) Prior Publication Data
US 2008/0253158 A1 Oct. 16, 2008

(30) Foreign Application Priority Data
Nov. 15, 2004 (JP) .............................. 2004-330069
Nov. 15, 2004 (JP) .............................. 2004-330070

(51) Int. Cl.
H02M 7/5387 (2007.01)
H02M 7/538 (2007.01)

(52) U.S. Cl. ...................................... 363/132; 363/133

(58) Field of Classification Search .......... 363/131–134
See application file for complete search history.

(56) References Cited

U.S. PATENT DOCUMENTS

| 4,414,479 | A | * | 11/1983 | Foley | 327/483 |
|---|---|---|---|---|---|
| 4,570,213 | A | * | 2/1986 | Ljung | 363/138 |
| 5,025,360 | A | * | 6/1991 | Latos | 363/132 |
| 5,450,306 | A | * | 9/1995 | Garces et al. | 363/132 |
| 6,058,037 | A | * | 5/2000 | Shibata et al. | 363/132 |
| 6,829,152 | B2 | | 12/2004 | Miura et al. | |
| 2003/0107905 | A1 | | 6/2003 | Miura et al. | |

FOREIGN PATENT DOCUMENTS

| JP | 10-327585 A | 12/1998 |
|---|---|---|
| JP | 2003-235240 A | 8/2003 |

* cited by examiner

*Primary Examiner*—Bao Q Vu
*Assistant Examiner*—Jue Zhang
(74) *Attorney, Agent, or Firm*—Foley & Lardner LLP

(57) ABSTRACT

There are provided: sets of pairs of main circuit switching elements (4u), (4x) that supply power to a load, connected in series with a DC power source; free-wheel diodes (5u), (5x) connected in anti-parallel with these main circuit switching elements; and a reverse voltage application circuit (8) that applies reverse voltage smaller than the DC voltage source to the free-wheel diodes when these free-wheel diodes cut off. The reverse voltage application circuit includes a current suppression circuit (10) that suppresses the main circuit current flowing in the low-voltage DC voltage power source on reverse recovery of the free-wheel diodes.

4 Claims, 16 Drawing Sheets

POWER CONVERTER

TECHNICAL FIELD

The present invention relates to a power conversion device constructed by connecting free-wheel diodes in anti-parallel with main circuit switching elements.

BACKGROUND ART

In a known inverter device construction, as shown in FIG. 1, free-wheel diodes Du to Dw and Dx to Dz are connected in anti-parallel with MOSFETs Su to Sw and Sx to Sz. In this construction, when the MOSFETs Su to Sw and Sx to Sz are turned OFF, the current energy accumulated in the load M is fed back through the free-wheel diodes Du to Dw and Dx to Dz.

In this case, when for example the MOSFET Su is turned ON when a forward current Ia flows in the free-wheel diode Dx, the PN voltage (so-called DC link voltage) is applied as reverse bias to both terminals of the free-wheel diode Dx, with the result that, as shown in FIG. 2, a reverse-direction current due to the residual charge flows in the free-wheel diode Dx before the free-wheel diode Dx cuts off. Considerable loss was therefore generated in the free-wheel diode Dx by the PN voltage and reverse-direction current, so it was necessary to employ a large heat radiator.

Measures were therefore taken to reduce the loss generated in the free-wheel diode by providing a reverse voltage application circuit, so that when the free-wheel diode was cut off, a small reverse voltage could be applied from this reverse voltage application circuit to the free-wheel diode, so that reverse recovery of the free-wheel diode could be brought about by the low-voltage DC voltage source of this reverse voltage application circuit. Such an invention is described in for example Laid-open Japanese Patent Application No. H. 10-327585, which is a Japanese Laid-open Patent Application.

FIG. 3 is a circuit diagram of a prior art power conversion device comprising a reverse voltage application circuit. In FIG. 3, the DC voltage source 1 is obtained by rectifying a three-phase AC power source; a smoothing capacitor 2 and a main inverter circuit 3 are connected between the positive side DC bus $1a$ and the load side DC bus $1b$ of this DC voltage source 1. The main inverter circuit 3 comprises a three-phase bridge connection of MOSFETs $4u$ to $4w$, $4x$ to $4z$ corresponding to the main circuit switching elements; free-wheel diodes $5u$ to $5w$ and $5x$ to $5z$ are connected in anti-parallel between the collector and emitter of the MOSFETs $4u$ to $4w$, $4x$ to $4z$; the load 6 (for example a motor) is connected on the output side of the main inverter circuit 3.

A control circuit (to be described) is provided that controls the main inverter circuit 3. This control circuit is positioned as a sub-circuit (auxiliary circuit) in regard to the main inverter circuit 3 referred to above.

Reverse voltage application circuits 7 are connected with the respective free-wheel diodes $5u$ to $5w$, $5x$ to $5z$. These reverse voltage application circuits 7 comprise low-voltage DC voltage sources 8 of lower voltage than the DC voltage source 1; power lines $8a$, $8b$ of the low-voltage DC voltage sources 8 are respectively connected between the collector and emitter of the MOSFETs $4u$ to $4w$, $4x$ to $4z$.

Each reverse voltage application circuit 7 comprises a base drive circuit 9; the power lines $9a$, $9b$ of the base drive circuit 9 are connected with the power lines $8a$, $8b$ of the low-voltage DC voltage source 8, so that, when drive signals SGu to SGw, SGx to SGz (not shown) are output to the base drive circuit 9 from a switching timing generating circuit, not shown, the base drive circuit 9 is driven by the power from the low-voltage DC voltage source 8, and the MOSFETs $4u$ to $4w$, $4x$ to $4z$ are turned ON.

The reverse voltage application circuits 7 comprise MOSFETs 17 corresponding to reverse voltage application switching elements; the MOSFET 17 is interposed on the power line $8a$ of the low-voltage DC voltage source 8; for the MOSFETs 17, MOSFETs of a lower voltage withstanding ability than the MOSFETs $4u$ to $4w$, $4x$ to $4z$ are selected. These MOSFETs 17 are turned ON during reverse recovery of the free-wheel diodes.

The reverse voltage application circuits 7 comprise a diode 13 and capacitor 14; these diodes 13 and capacitors 14 are connected in parallel with the power lines $8a$ of the low-voltage DC voltage sources 8, so that, when the MOSFETs $4u$ to $4w$, $4x$ to $4z$ are turned ON, the capacitors 14 are charged from the low-voltage DC voltage sources 8 through the diodes 13. In this way, the drive power of the base drive circuit 18 is charged on the capacitors 14. A capacitor 15 is connected between the power lines $8a$, $8b$ and a diode 29 is connected in series with the power line $8a$. Also, a diode 16 is connected between the power lines $8a$, $8b$.

The power lines $18a$, $18b$ of the base drive circuit 18 are connected with both terminals of the capacitor 14, so that, when drive signals SGru to SGrw, SGrx to SGrz (not shown) are output to the base drive circuit 18 from potential discrimination circuits (voltage discrimination circuits), not shown, that output drive signals in response to the potential of the points A, B, C of the main inverter circuit 3, the base drive circuit 18 is driven by the charged power of the capacitor 14, thereby turning the MOSFET 17 ON. In this way, reverse voltage smaller than the DC voltage source 1 is applied from the low-voltage DC voltage source 8 through the MOSFET 17 to the free-wheel diodes $5u$ to $5w$ and $5x$ to $5z$.

However, in the case of such a conventional device, in order to operate the reverse voltage application circuit 7 during reverse recovery of the free-wheel diodes, it is necessary to ascertain the direction of the main circuit current by detecting the potential at the points A, B, C of the main inverter circuit 3, so a voltage detector is required.

Furthermore, during reverse recovery of the free-wheel diodes, the current of the main circuit temporarily flows to the low-voltage DC voltage power source 8 of the reverse voltage application circuit, so there is considerable voltage fluctuation of the auxiliary power source. Specifically, during reverse recovery of the free-wheel diodes, the current that is flowing in the free-wheel diodes is prevented from flowing by the reverse voltage application circuit 7, so the current that was flowing in the free-wheel diodes temporarily flows into the reverse voltage application circuit 7, with the result that a circuit is formed whereby the free-wheel diodes are bypassed through the low-voltage DC voltage power source 8 of the reverse voltage application circuit. As a result, considerable voltage fluctuation of the low-voltage DC voltage power source 8 of the reverse voltage application circuit is produced. As a result, the current capacity of the low-voltage DC voltage power source 8 of the reverse voltage application circuit must be made large.

An object of the present invention is to provide a power conversion device wherein the main circuit current flowing into the auxiliary power source of the reverse voltage application circuit during reverse recovery of the free-wheel diodes is suppressed and reverse recovery of the free-wheel diodes can be appropriately performed.

A further object of the present invention is to provide a power conversion device wherein reverse recovery of the free-wheel diodes can be appropriately performed without providing a detector to detect the direction of the current flowing through the free-wheel diodes and wherein the current of the main circuit flowing to the auxiliary power source of the reverse voltage application circuit during reverse recovery of the free-wheel diodes can be suppressed.

DISCLOSURE OF THE INVENTION

In order to achieve the above objects, a power conversion device according to the present invention is constructed as follows. Specifically, a power conversion device according to the present invention comprises:

sets of pairs of main circuit switching elements that supply power to a serially connected load from a DC voltage source;

free-wheel diodes connected in anti-parallel with these main circuit switching elements; and a reverse voltage application circuit that applies reverse voltage smaller than the DC voltage source to each of the free-wheel diodes when these free-wheel diodes cut off;

wherein the reverse voltage application circuit comprises:

a series connection of an auxiliary power source of voltage lower than the DC voltage source, a reverse voltage application switching element that is turned ON during reverse recovery of the free-wheel diodes and whose ability to withstand voltage is lower than the main circuit switching elements, and a high-speed auxiliary diode whose reverse recovery time is shorter than that of the free-wheel diodes; and the auxiliary power source comprises:

a low-voltage DC voltage power source of lower voltage than the voltage of the DC voltage source;

a current suppression circuit that suppresses the main circuit current flowing in the low-voltage DC voltage power source during reverse recovery of the free-wheel diodes, connected in series with the low-voltage DC voltage power source; and a high frequency capacitor of low internal impedance even in the high frequency band, connected in parallel with the series circuit of the low-voltage DC voltage power source and current suppression circuit.

Furthermore, a power conversion device according to the present invention comprises:

sets of pairs of main circuit switching elements that supply power to a serially connected load from a DC voltage source;

free-wheel diodes connected in anti-parallel with these main circuit switching elements; and a reverse voltage application circuit that applies reverse voltage smaller than the DC voltage source to each of the free-wheel diodes when these free-wheel diodes cut off;

wherein the reverse voltage application circuit comprises:

a main circuit switching control circuit comprising:

a series connection of an auxiliary power source of voltage lower than the DC voltage source, a reverse voltage application switching element that is turned ON during reverse recovery of the free-wheel diodes and whose ability to withstand voltage is lower than the main circuit switching elements, and a high-speed auxiliary diode whose reverse recovery time is shorter than that of the free-wheel diodes; that changes over the main circuit switching elements and has a rest period of short time in which both main circuit switching elements are turned OFF when the set of a pair of main circuit switching elements mutually change over their ON condition and OFF condition; and a reverse voltage application switching control circuit that turns ON the reverse voltage application switching element during the rest period that commences at the time point where the main circuit switching element is turned OFF, and that turns this reverse voltage application switching element OFF after lapse of the rest period.

BRIEF DESCRIPTION OF DRAWINGS

FIG. 15 is a circuit diagram of major parts of a reverse voltage application circuit in a power conversion device according to a seventh embodiment of the present invention;

BEST MODE FOR CARRYING OUT THE INVENTION

Embodiments of a power conversion device according to the present invention are described in detail below with reference to FIG. 4 to FIG. 23.

First Embodiment

Figure 1:
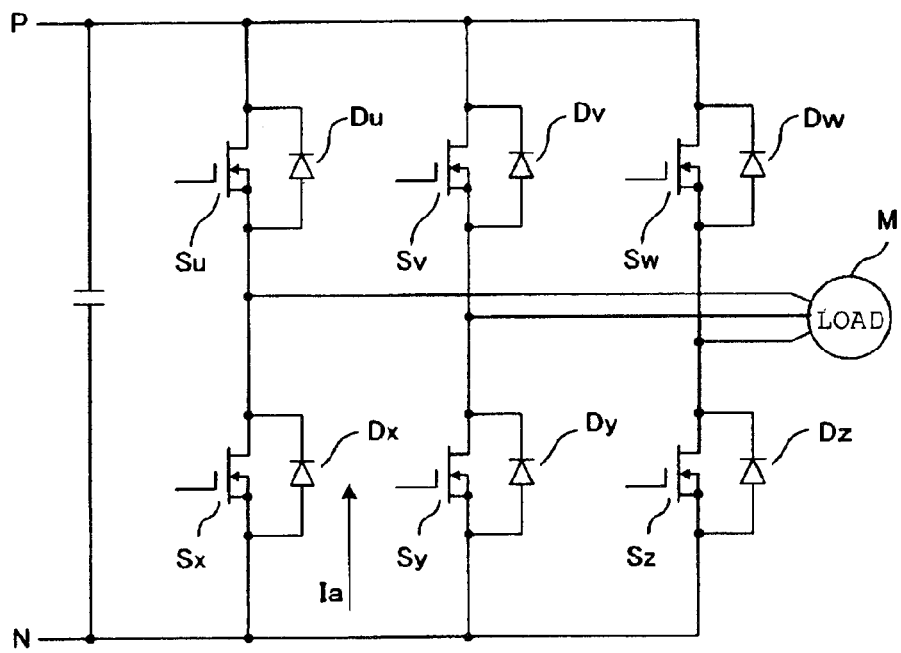
FIG. 1 is a circuit diagram showing an example of a prior art inverter circuit.
Figure 2:
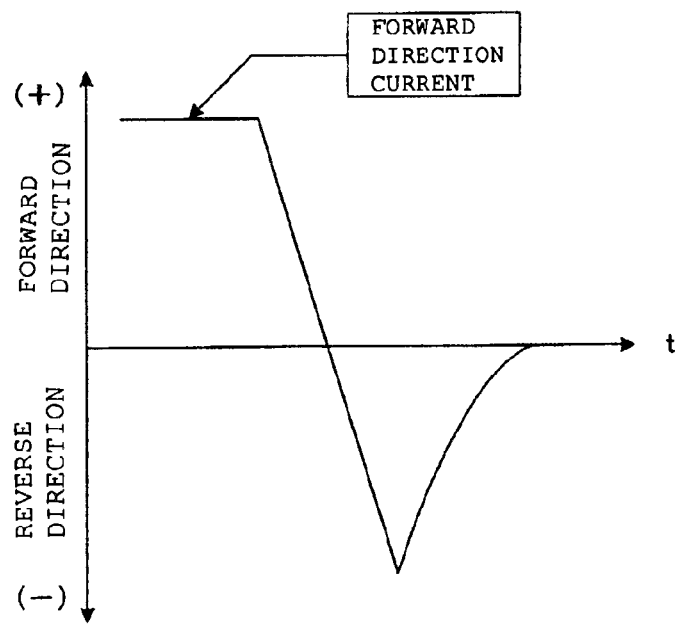
FIG. 2 is a current waveform diagram showing a reverse recovery characteristic of a free-wheel diode.
Figure 3:
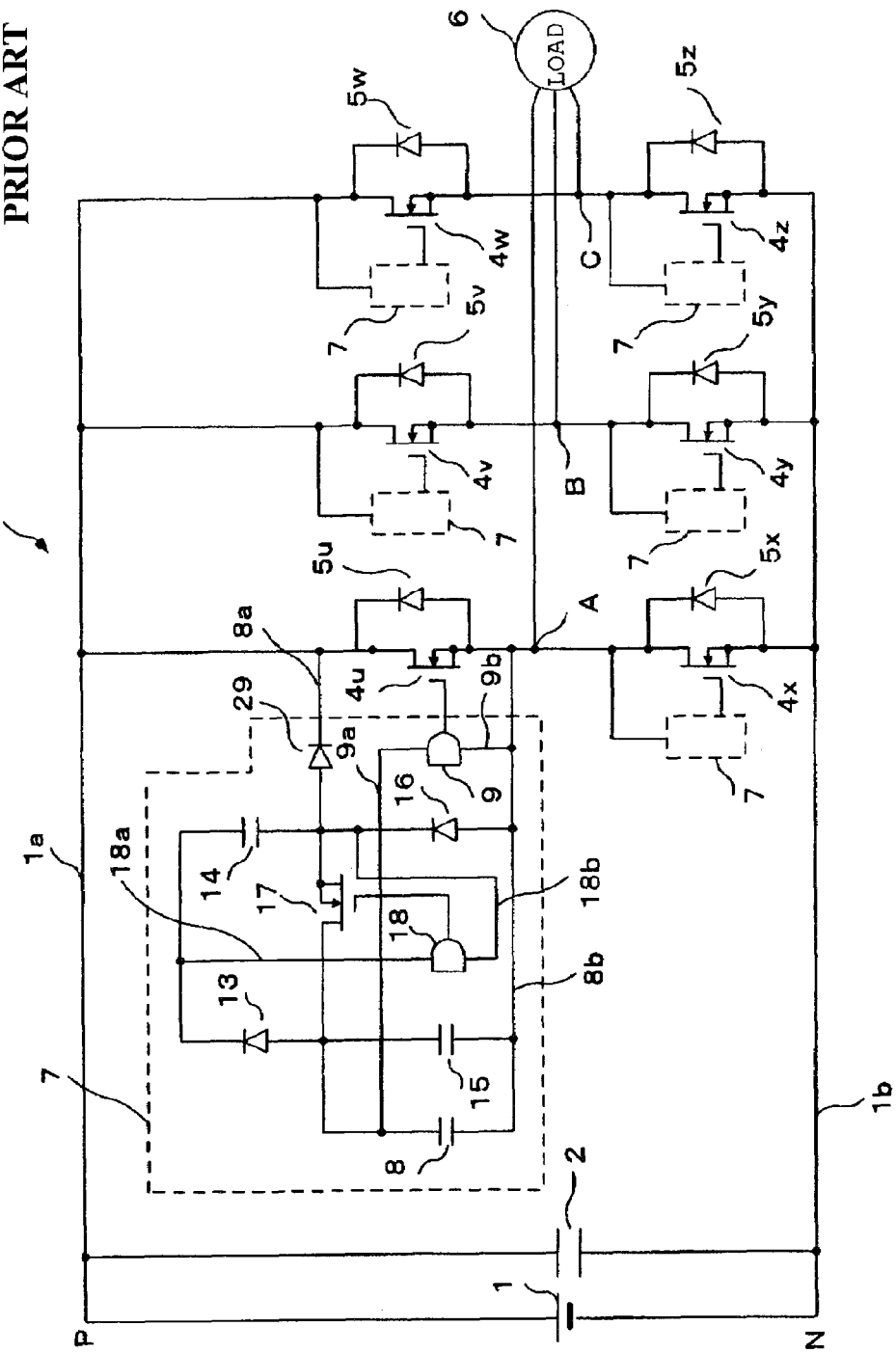
FIG. 3 is a circuit diagram showing an example of a prior art power conversion device.
Figure 4:
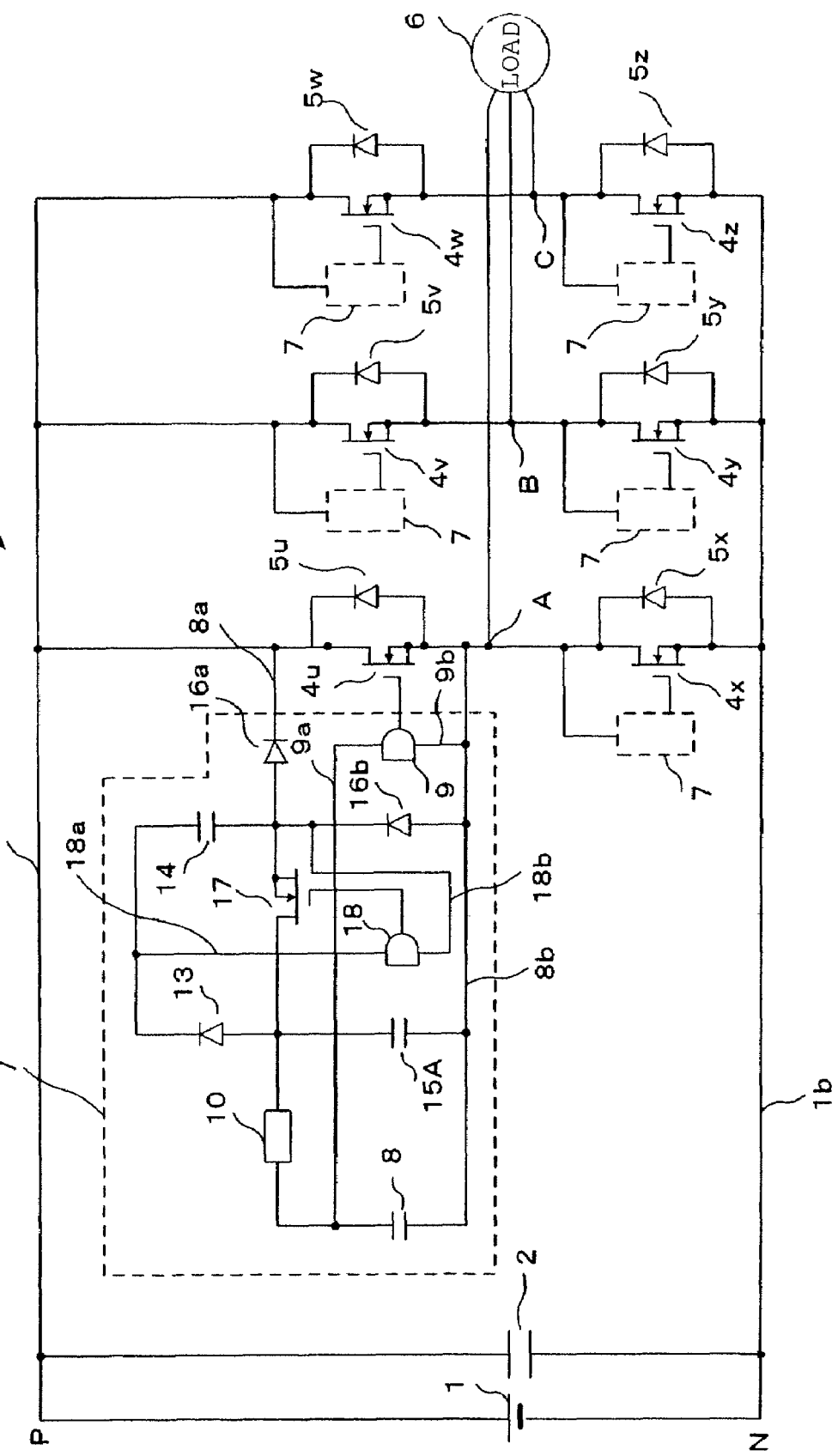
FIG. 4 is a circuit diagram of a power conversion device according to a first embodiment of the present invention.

FIG. 4 is a circuit diagram of a power conversion device according to a first embodiment of the present invention. In this first embodiment, compared with the prior art example shown in FIG. 3, there is additionally provided a current suppression circuit 10 that suppresses the main circuit current flowing to the low-voltage DC voltage power source 8 during reverse recovery of the free-wheel diodes 5 ($5u$, $5v$, $5w$, $5x$, $5y$, $5z$) in the reverse voltage application circuit 7 and a high frequency capacitor 15A that has low internal impedance even in the high frequency band is connected in parallel with the series circuit of the low-voltage DC voltage power source 8 and current suppression circuit 10. Elements which are the same as in the case of FIG. 3 are given the same reference symbols and repeated description is dispensed with.

In FIG. 4, the voltage at the point A of the main inverter circuit 3 is detected and, when it is found that a condition exists in which reverse recovery of the free-wheel diode $5u$ is being performed, a drive signal is output to the base drive circuit 18, turning the MOSFET 17 ON. In this way, reverse voltage is applied to the free-wheel diode $5u$ through the power line $8a$ and the current flowing in the free-wheel diode $5u$ is thereby diminished.

When this happens, the main circuit current that was flowing on the P side of the DC voltage power source through the free-wheel diode $5u$ from the load 6 flows into the reverse voltage application circuit 7. The main circuit current that has thus flowed into the reverse voltage application circuit flows into the low-voltage DC voltage power source 8 and high frequency capacitor 15A, but, since the current suppression circuit 10 is connected in series with the low-voltage DC voltage power source 8, the current flowing in the low-voltage voltage DC voltage power source 8 is suppressed, and flows in the direction of the high-frequency capacitor 15A. The main circuit current flowing in the low-voltage DC voltage power source can thereby be suppressed and the need to increase the current capacity of the constant voltage power source is eliminated. Also, the current that is needed for reverse recovery of the free-wheel diode $5u$ can flow for a short time, so it is unnecessary to prolong the rest period when changing over ON/OFF of the set of a pair of main circuit switching elements $4u$, $4x$ that turn ON/OFF in a complementary relationship. Consequently, deterioration (waveform deterioration) or other deterioration of control quality of the power conversion device generated due to the rest period can also be suppressed.

Figure 5:
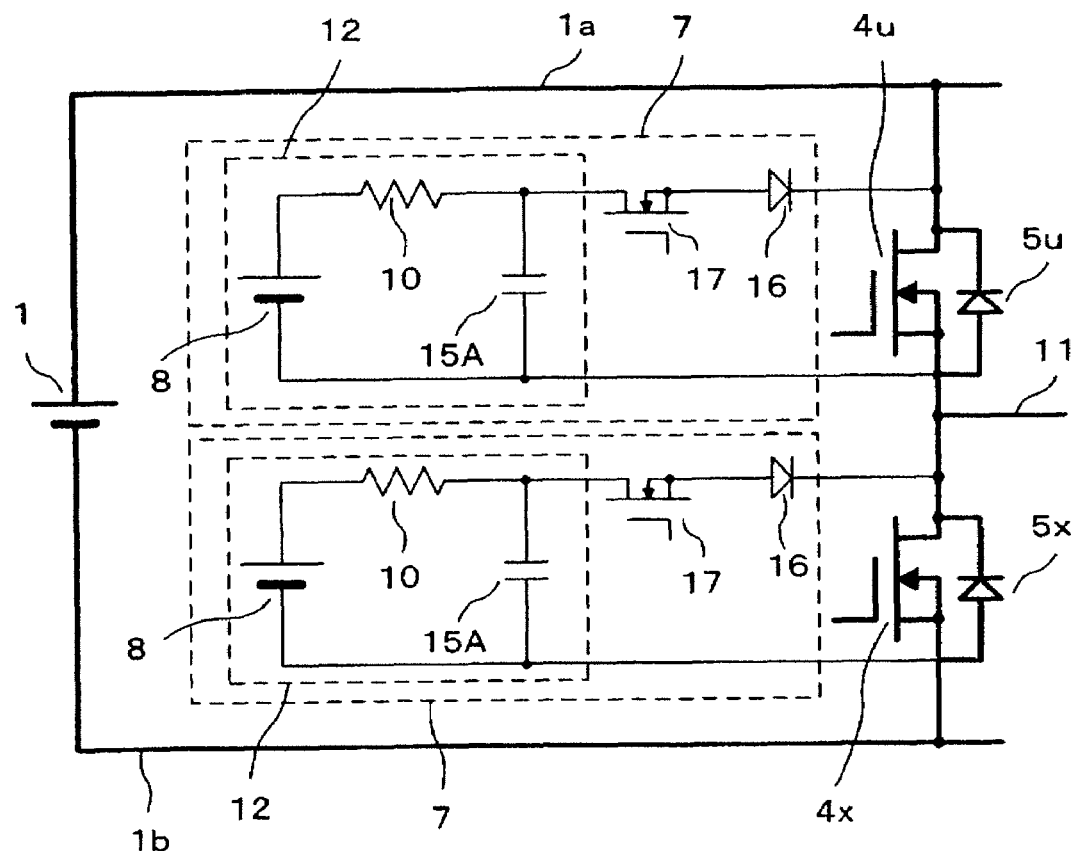
FIG. 5 is a circuit diagram of major parts of a reverse voltage application circuit in a power conversion device according to a first embodiment of the present invention.

FIG. 5 is a circuit diagram of major parts of a reverse voltage application circuit 7 in a power conversion device according to a first embodiment. It should be noted that, in FIG. 5, description of the base drive circuits 9 and 18 etc is dispensed with. The DC voltage source 1 is obtained by rectifying for example three-phase AC power and smoothing using a smoothing capacitor 2. A positive side DC bus $1a$ and negative side DC bus $1b$ extend from the DC voltage source 1 and two MOSFETs, namely, the main circuit switching elements $4u$, $4x$ are connected in series between the positive side DC bus $1a$ and negative side DC bus $1b$.

Both this positive side main circuit switching element $4u$ and negative side main circuit switching element $4x$ incorporate respective free-wheel diodes $5u$, $5x$. A load terminal 11 that is connected with the load is connected from between the positive side main circuit switching element $4u$ and negative side main circuit switching element $4x$; also, a reverse voltage application circuit 7 is connected between the drain terminal and source terminal of the main circuit switching elements 4 (i.e. between the cathode terminal and the anode terminal of the free-wheel diodes 5).

The reverse voltage application circuit 7 is constituted by a series connection of an auxiliary power source 12 of lower voltage than the DC voltage source 1 and a reverse voltage application switching element 17 whose ability to withstand voltage is lower than that of the main circuit switching elements 4, and a high-speed auxiliary diode 16 whose reverse recovery time is shorter than that of the free-wheel diodes 5.

The auxiliary power source 12 is constituted by a series connection of the low-voltage DC voltage power source 8, whose voltage is lower than about ¼ of the voltage of the DC voltage source, a resistor constituting a current suppression circuit 10, and a high-frequency capacitor 15A whose internal impedance is low even in the high-frequency band.

Figure 6:
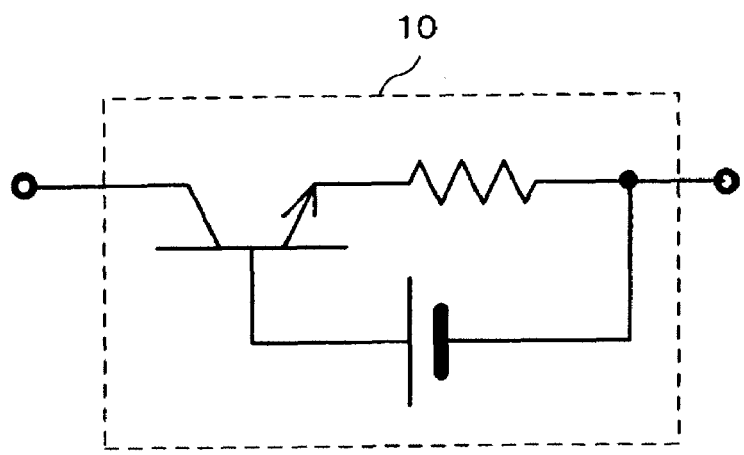
FIG. 6 is a circuit diagram of a current suppression circuit according to a first and seventh embodiment.

For the high-frequency capacitor 15A there is employed a high-frequency capacitor such as a ceramic capacitor or film capacitor, rather than an electrolytic capacitor, such as is used for smoothing. Also, for the resistor constituting the current suppression circuit 10, there may also be employed for example wiring resistance such as copper foil pattern wiring resistance of a printed circuit board, or copper wire or copper sheet. In addition, for example, a constant current circuit as shown in FIG. 6 may be employed.

In the layout of FIG. 5, the discharge path linking the high-frequency capacitor 15A, reverse voltage application switching element 17, auxiliary diode 16 and free-wheel diode 5 is wired to be as short as possible, so as to reduce impedance.

In the first embodiment constructed in this way, since a high frequency capacitor 15A of low internal impedance even in the high-frequency band is employed, charge discharge from this high-frequency capacitor 15A is performed at high speed, so the rise time of the current flowing when reverse recovery of the free-wheel diode 5 is effected can be made short, and the maximum current can also be made high. The action of the current suppression circuit 10 is also assisted by the fact that a current of a more uniform waveform flows in the low-voltage DC voltage power source 8, rather than such an impulse-form current flowing directly in the low-voltage DC voltage power source 8.

According to the first embodiment, the current that is necessary for reverse recovery of the free-wheel diode 5 can flow for a short time but there is no need to employ a long rest period, so deterioration of control quality (for example waveform deterioration) of the power conversion device generated by the rest periods when ON/OFF of the set of a pair of main circuit switching elements $4u$, $4x$ that turn ON/OFF in a complementary relationship is changed over can be suppressed.

Also, during the period in which reverse recovery current is supplied to the free-wheel diode 5, the main circuit current (load current) also passes through the reverse voltage application circuit 7, also increasing the loss due to the main circuit current; it is therefore desirable that reverse recovery of the free-wheel diode 5 should be completed as rapidly as possible and this demand can also be achieved. In addition, since the load on the low-voltage DC voltage power source 8 is alleviated, the low-voltage DC voltage power source 8 need only be a low current capacity power source, enabling internal generation of heat by the low-voltage DC voltage power source 8 to be alleviated.

Second Embodiment

Figure 7:
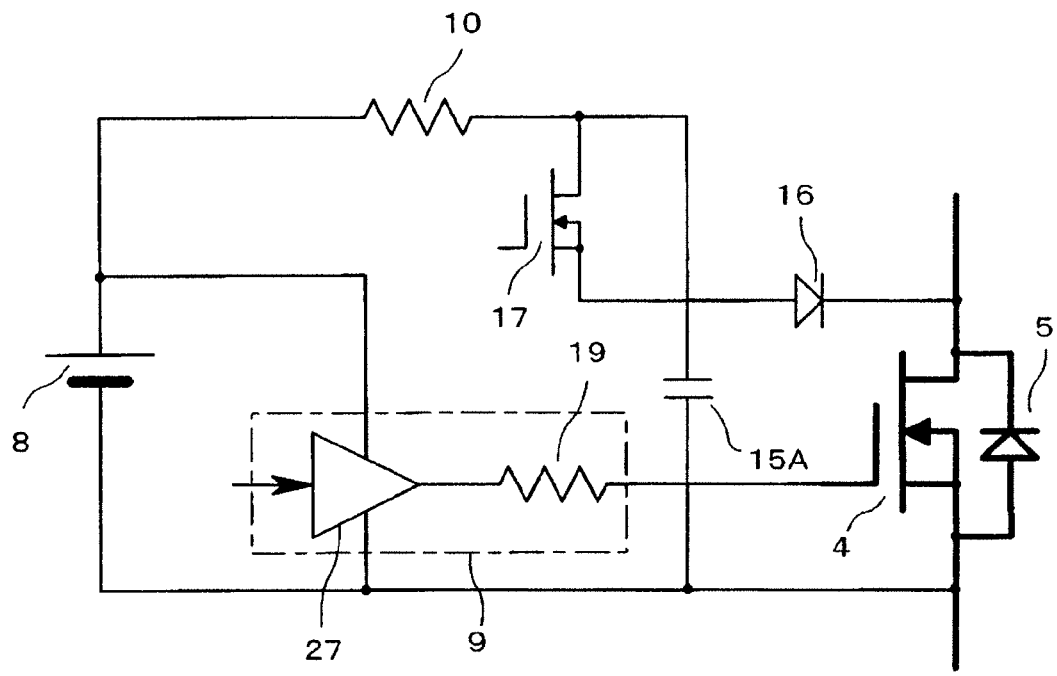
FIG. 7 is a circuit diagram of major parts of a reverse voltage application circuit in a power conversion device according to a second embodiment of the present invention.

FIG. 7 is a circuit diagram of major parts of a reverse voltage application circuit 7 in a power conversion device according to a second embodiment of the present invention. In this second embodiment, in comparison with the first embodiment shown in FIG. 4, the low-voltage DC voltage power source 8 is arranged to be employed as a drive power source of the main circuit switching elements 4.

In FIG. 7, the base drive circuit 9 of a main current switching element 4 comprises a gate drive amplifier 27 and gate resistance 19; the gate drive amplifier 27 obtains power from the low-voltage DC voltage power source 8 and inputs this to the gate terminal of the main circuit switching element 4 as a gate drive signal of the main circuit switching elements 4 through the gate resistance 19. FIG. 7 shows the case where a resistor is employed as the current suppression circuit 10.

Since, due to the current suppressing effect of the current suppression circuit 10 and the high frequency impedance reducing effect of the high-frequency capacitor 15A, the impulse-form current from the low-voltage DC voltage power source 8 that accompanies reverse recovery in the free-wheel diode 5 ceases to flow and voltage fluctuations of the low-voltage DC voltage power source 8 become extremely small even during reverse recovery of the free-wheel diode 5. Since, in the second embodiment, voltage fluctuations of the low-voltage DC voltage power source 8 become small and its voltage is thus stabilized, even though power is supplied to the base drive circuit 9 of the main circuit switching elements 4, adverse effects such as power source voltage fluctuations during reverse recovery of the free-wheel diode 5 can be prevented. Also, simplification of the circuit can be achieved by sharing of the power of the low-voltage DC voltage power source 8 and power source of the base drive circuit 9.

Third Embodiment

Figure 8:
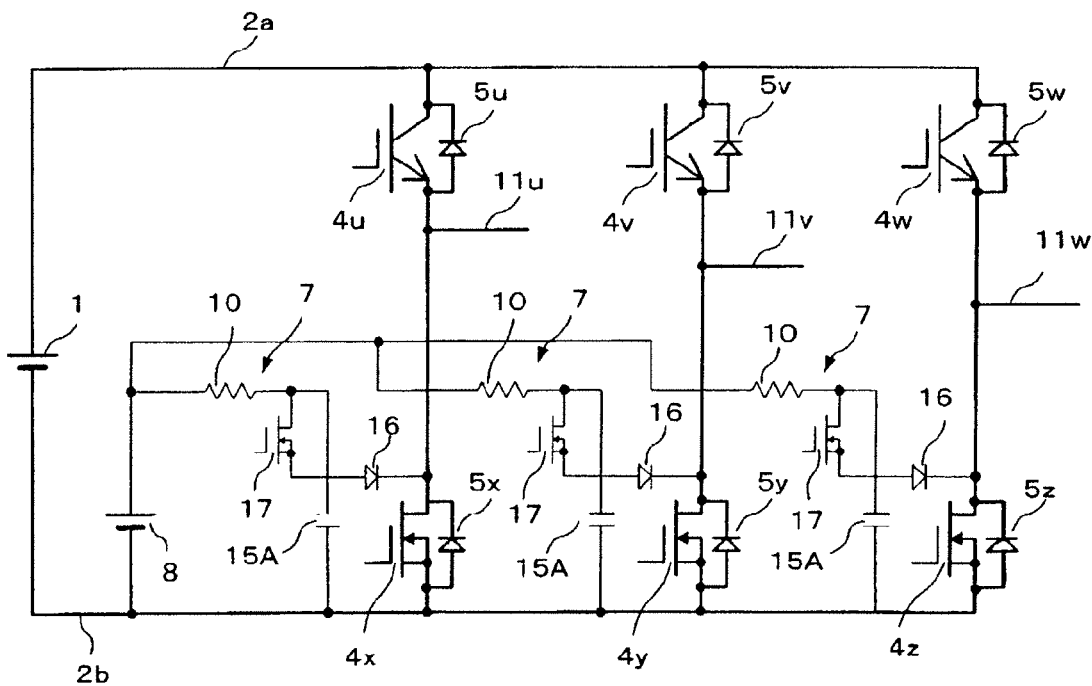
FIG. 8 is a circuit diagram of major parts of a reverse voltage application circuit in the a power conversion device according to a third embodiment of the present invention.

FIG. 8 is a circuit diagram of major parts of a reverse voltage application circuit 7 in a power conversion device according to a third embodiment of the present invention. In comparison with the first embodiment shown in FIG. 4, in this third embodiment, of the sets of pairs of main circuit switching elements 4u to 4w, 4x to 4z, a reverse voltage application circuit 7 is provided only for the main circuit switching elements 4x to 4z on the side that is connected with the negative side of the DC power source. FIG. 8 shows the power conversion device in the case where this is used as a three-phase inverter.

In FIG. 8, the positive side DC bus 1a and negative side DC bus 1b extend from the DC voltage source 1, IGBTs (Insulated Gate Bipolar Transistor) are employed for the positive side main circuit switching elements 4u to 4w between the positive side DC bus 1a and negative side DC bus 1b, and MOSFETs are employed for the negative side main circuit switching elements 4x to 4z.

Whereas the MOSFETs (Metal Oxide Semiconductor Field-Effect Transistor) incorporating free-wheel diodes 5x to 5z are employed for the negative side main circuit switching elements 4x to 4z, IGBTs, that do not incorporate free-wheel diodes 5u to 5w, are employed for the positive side main circuit switching elements 4u to 4w, so free-wheel diodes 5u to 5w which have a short reverse recovery time and little reverse recovery loss are connected in parallel with the positive side main circuit switching elements 4u to 4w. Consequently, the positive side main circuit switching elements 4u to 4w do not need to have a reverse voltage application circuit 7.

That is, although a reverse voltage application circuit 7 is connected with the negative side main circuit switching elements 4x to 4z, no reverse voltage application circuit 7 is connected with the positive side main circuit switching element 4u. Regarding the reverse voltage application circuits 7 of the negative side main switching elements 4x to 4z, only a single low-voltage DC voltage power source 8 is used in common for the circuits of the three phases. This is because the power line of the reverse voltage application circuits 7 on one side of the x phase to z phase can be shared with the negative side DC bus 1b of the DC voltage source 1.

With the third embodiment, since reverse voltage application circuits 7 are employed only for the negative side main circuit switching elements 4x to 4z, it is unnecessary to provide low-voltage DC voltage power sources 8 for each phase of the three-phase circuit: a single shared low-voltage DC voltage power source 8 is sufficient for the respective phases. Also, since only a single low-voltage DC voltage power source 8 need be provided, simplification of the circuit can be achieved.

Fourth Embodiment

Figure 9:
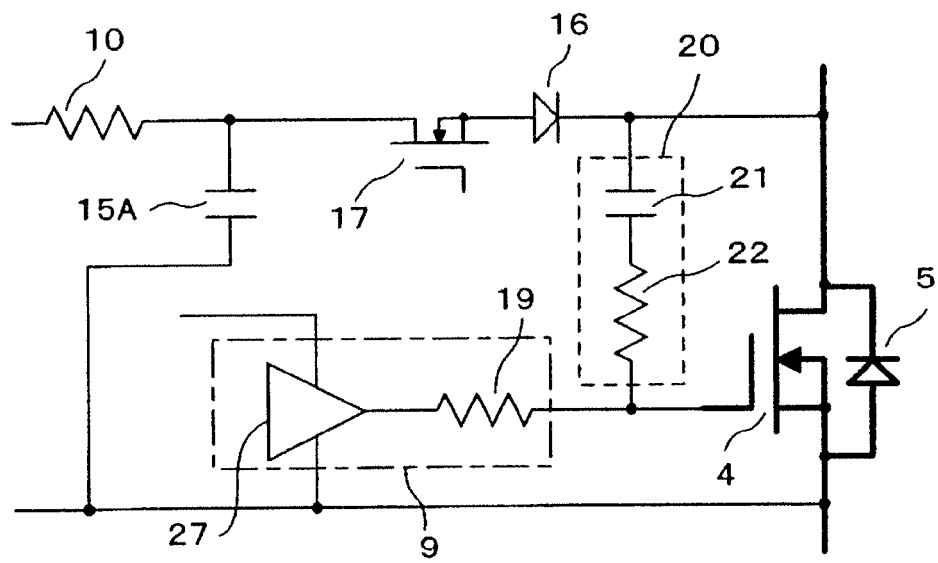
FIG. 9 is a circuit diagram of major parts of a reverse voltage application circuit in a power conversion device according to a fourth embodiment of the present invention.

FIG. 9 is a circuit diagram of major parts of a reverse voltage application circuit 7 in a power conversion device according to a fourth embodiment of present invention. In this fourth embodiment, in comparison with the first embodiment shown in FIG. 4, a rate of voltage change suppression circuit 20 that regulates the voltage of the drive signal of the main circuit switching element 4 is provided in order to suppress abrupt time-wise variation of the output voltage of the main circuit switching elements 4.

In FIG. 9, the rate of voltage change suppression circuit 20 is constituted by connecting in series a rate of voltage change suppression capacitor 21 and rate of voltage change suppression resistor 22 and is connected between the drain terminal of the main circuit switching element 4 and gate terminal of the main circuit switching element 4.

During reverse recovery of the free-wheel diode, the free-wheel diode 5 is abruptly turned OFF by the action of the reverse current application circuit 7. Consequently, the rate of time-wise change of the drain-source voltage of the main circuit switching elements 4 becomes large. Consequently, when the drain voltage of the main circuit switching element 4 abruptly starts to drop, the gate voltage of the main circuit switching element 4 is lowered by the action of the rate of voltage change suppression circuit 20 and, as a result, the speed of turning OFF of the main switching element is moderated.

With the fourth embodiment, since the speed of turning OFF of the main switching elements 4 is moderated, the rate of voltage fluctuation of the main circuit switching elements 4 is suppressed and generation of electromagnetic interference (noise) is suppressed.

Fifth Embodiment

Figure 10:
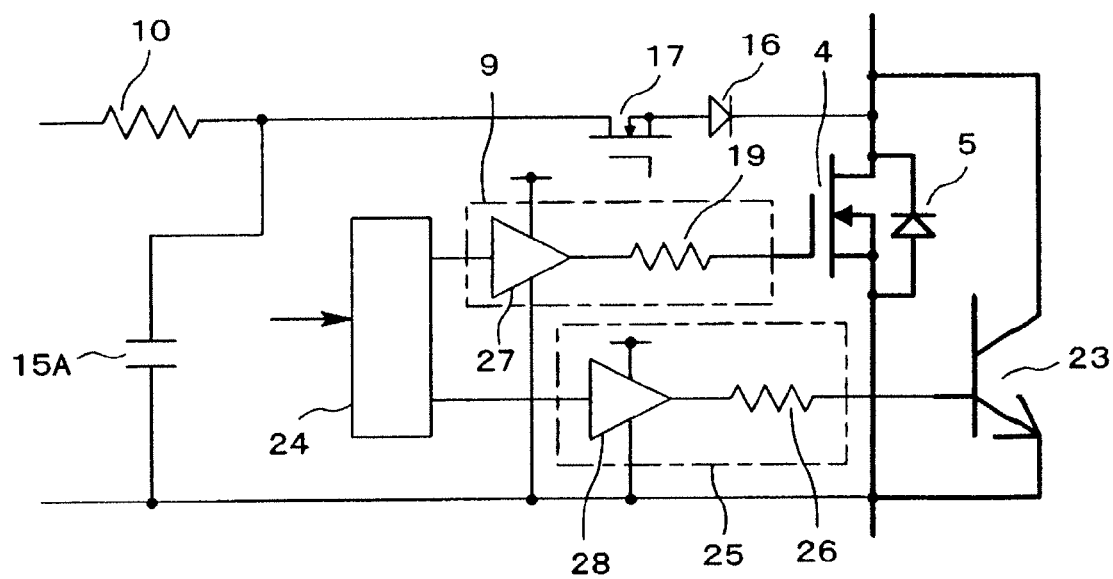
FIG. 10 is a circuit diagram of major parts of a reverse voltage application circuit in a power conversion device according to a fifth embodiment of the present invention.

FIG. 10 is a circuit diagram of major parts of a reverse voltage application circuit 7 in a power conversion device according to a fifth embodiment of the present invention. In this fifth embodiment, in comparison with the first embodiment shown in FIG. 4, MOSFETs designed giving priority to low ON resistance are employed as the main circuit switching elements 4 and bipolar elements 23 are connected in parallel with these main circuit switching elements 4. These bipolar elements 23 turn ON practically simultaneously with the main circuit switching elements 4 but turn OFF somewhat earlier than the main circuit switching elements 4 turn OFF.

In FIG. 10, the bipolar elements 23 are connected in parallel with the main circuit switching elements 4. On receipt of an original gate signal, a gate signal delay circuit 24 distributes this to a drive signal to the main circuit switching element 4 and a base drive signal to the bipolar element 23; the OFF timing of the gate drive signal of the main circuit switching elements 4 is thereby delayed somewhat from the OFF timing of the base drive signal of the bipolar elements 23.

The gate drive signal to the main circuit switching element 4 is input to the gate 4 of the main circuit switching element through a gate drive amplifier 27 of the base drive circuit 9 and a gate resistance 19. Likewise, the base drive signal to the bipolar element 23 is input to the bipolar element 23 through a gate drive amplifier 28 and gate resistance 26 of the base drive circuit 25.

Figure 11:
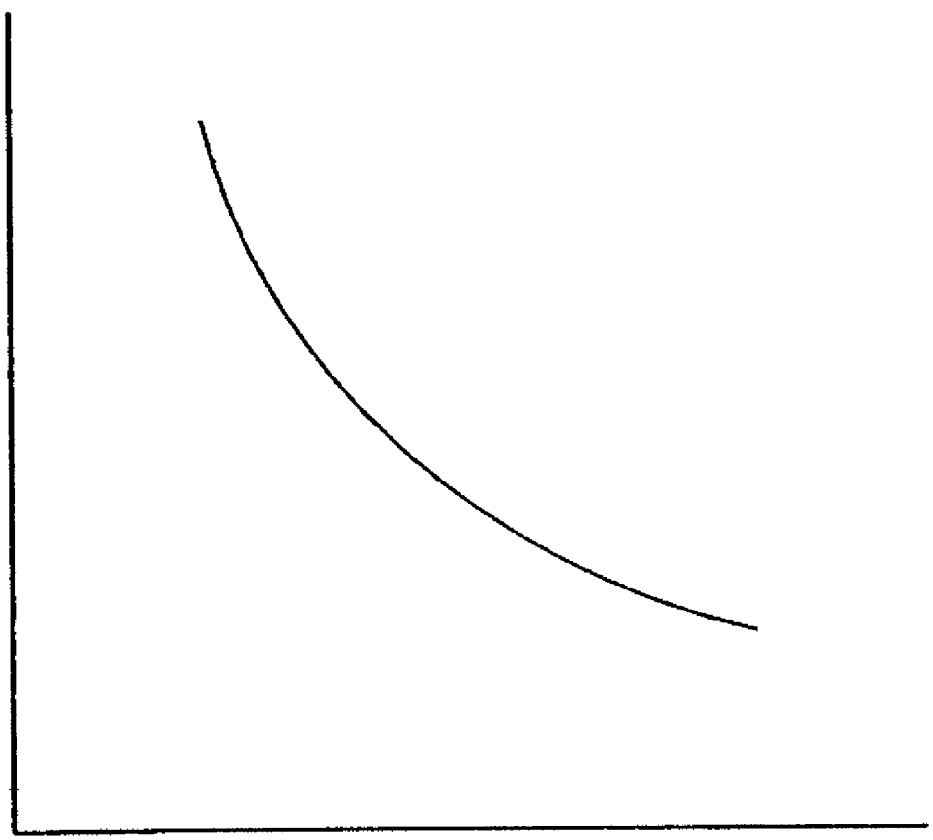
FIG. 11 is a graph of the gradient curve of the ON resistance and reverse recovery time of a typical power MOSFET element characteristic.

FIG. 11 shows the gradient curve of the ON resistance and reverse recovery time of a typical power MOSFET element characteristic. FIG. 11 shows the trend that, if the MOSFET is designed such as to have a small ON resistance, the reverse recovery time is prolonged and, as a result, the losses caused by reverse recovery increase; and that contrariwise, if the MOSFET is designed so as to have a large ON resistance, the reverse recovery time is shortened, and, as a result, the losses caused by reverse recovery become small.

Accordingly, in the fifth embodiment, as the power MOSFETs that are used for the main circuit switching elements 4, power MOSFETs are employed that are designed giving priority to low ON resistance and bipolar elements 23 that turn ON practically simultaneously with the main circuit switching elements 4 but turn OFF somewhat earlier than the main circuit switching elements 4 turn OFF are connected in parallel therewith.

In this way, parallel operation with the bipolar elements 23 having an accumulation time can be achieved. Since considerable current flows in the low resistance bipolar elements 23 during the ON period, reduction of the ON losses can be achieved. Also, since the OFF timing of the bipolar elements 23 when turning OFF is somewhat early, the main circuit switching elements 4 turn OFF after the bipolar elements 23 having an accumulation time have completely turned OFF, so the turn-off losses can also be reduced.

With the fifth embodiment, the chip area of the power semiconductors can be reduced and the losses generated can be decreased, so a power conversion device of high efficiency and low cost can be realized.

Sixth Embodiment

Figure 12:
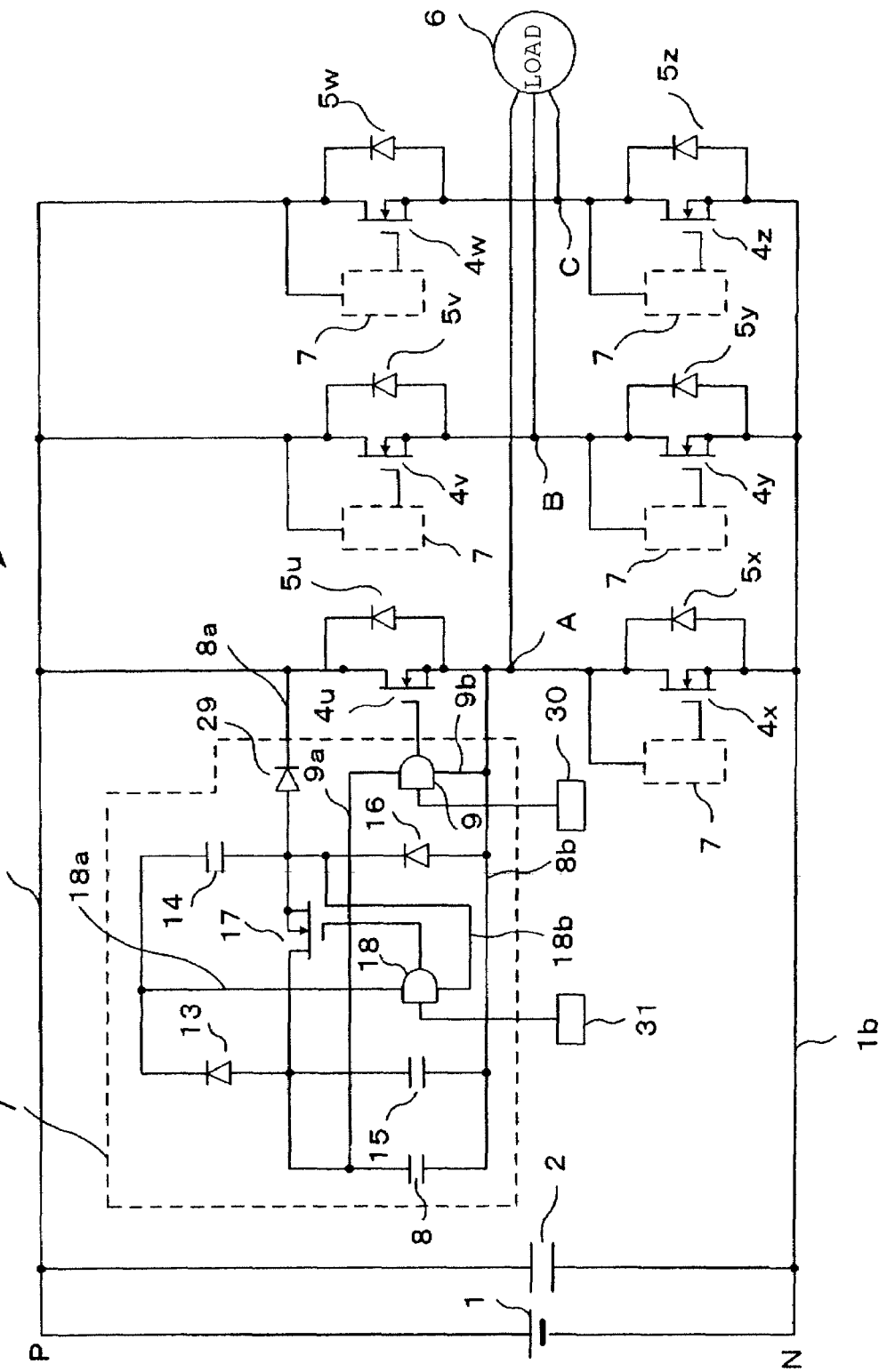
FIG. 12 is a circuit diagram of a power conversion device according to a sixth embodiment of the present invention.

Next, FIG. 12 is a circuit diagram of a power conversion device according to a sixth embodiment of the present invention. In this sixth embodiment, compared with the prior art example shown in FIG. 3, there are provided: a main circuit switching control circuit 30 that changes over both main circuit switching elements 4u to 4w, 4x to 4z when the ON condition and OFF condition of the sets of pairs of main circuit switching elements 4u to 4w, 4x to 4z are mutually changed over, with the provision of a short rest period in which both the two main circuit switching elements 4u to 4w, 4x to 4z are OFF; and a reverse voltage application switching control circuit 31 that turns ON the reverse voltage application switching element 17 during a rest period that commences from the time point where the main circuit switching elements 4u to 4w, 4x to 4z were turned OFF and that turns OFF after the lapse of a rest period. Elements that are identical with elements of FIG. 3 are given the same reference symbols and overlapping description is dispensed with.

In FIG. 12, the main circuit switching control circuit 30 outputs ON/OFF instructions of the main circuit switching elements 4u to 4w, 4x to 4z: it outputs the ON/OFF instructions in a complementary relationship with the main circuit switching elements 4u to 4w, 4x to 4z constituting a set. In FIG. 12, the main circuit switching control circuit 30 is shown connected solely with the main circuit switching element 4u, but it is also connected with the other main circuit switching elements 4v to 4z.

The main circuit switching control circuit 30, for example in respect of the main circuit switching element 4u and main circuit switching element 4x constituting a set, outputs an ON instruction to the main circuit switching element 4u when the main circuit switching element 4x becomes OFF, and outputs an OFF instruction to the main circuit switching element 4u when the main circuit switching element 4x becomes ON.

In this case, a short rest period is provided in which both the main circuit switching elements 4u, 4x are OFF and the main circuit switching control circuit 30 changes over the main circuit switching element 4u to the ON condition during this rest period.

During the rest period beginning from the time point where the main circuit switching element 4u is turned OFF, the reverse voltage application switching control circuit 31 of the reverse voltage application circuit 7 operates the reverse voltage application circuit 7 by turning the reverse voltage application switching element 17 ON. After lapse of this rest period, the reverse voltage application switching element 17 is then turned OFF and the operation of the reverse voltage application circuit 7 is disabled. In this way, the reverse voltage application circuit 7 can be operated appropriately irrespective of the direction of the main circuit current flowing in the main circuit, and the provision of for example a detector to detect the direction of the current becomes unnecessary.

Figure 13:
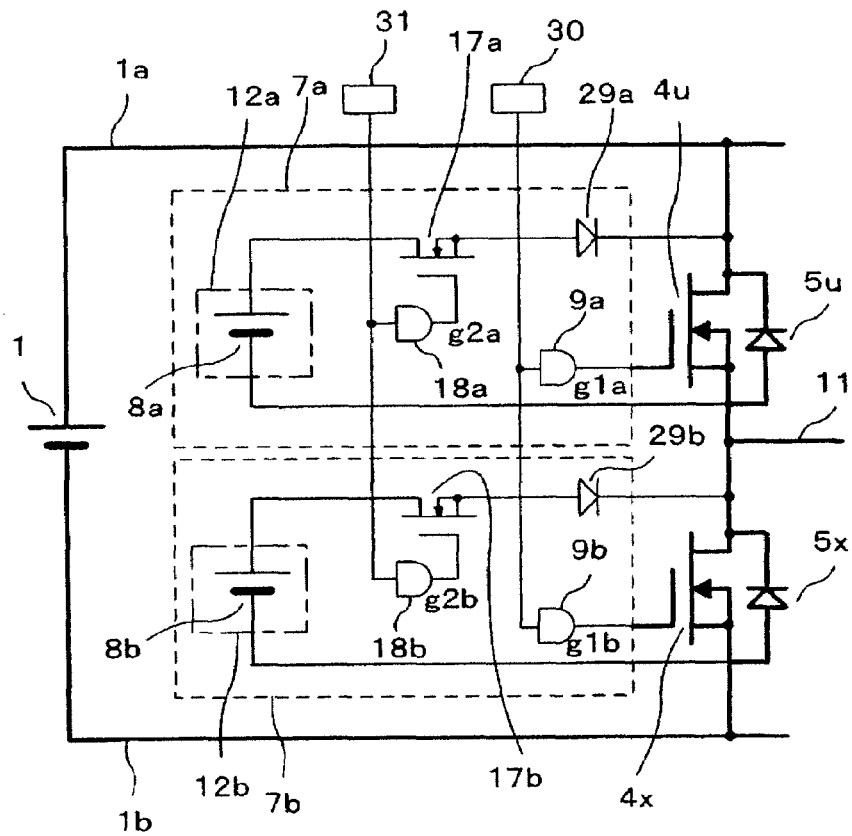
FIG. 13 is a circuit diagram of major parts of a reverse voltage application circuit in a power conversion device according to a sixth embodiment of the present invention.

FIG. 13 is a circuit diagram of major parts of a reverse voltage application circuit 7 in a power conversion device according to a sixth embodiment. The DC voltage source 1 is obtained for example by rectifying three-phase AC power and smoothing using a smoothing capacitor 2. A positive side DC bus 1a and negative side DC bus 1b extend from the DC voltage source 1; between the positive side DC bus 1a and negative side DC bus 1b, two MOSFETs corresponding to the main circuit switching elements 4u, 4x are connected in series. Respective free-wheel diodes 5u, 5x are incorporated in both this positive side main circuit switching element 4u and negative side main circuit switching element 4x. A load terminal 11 that is connected with the load is extracted from between the positive side main circuit switching element 4u and negative side main circuit switching element 4x.

Reverse voltage application circuits 7a, 7b are connected between the drain terminal and source terminal of the main circuit switching elements 4u, 4x. Specifically, the reverse voltage application circuits 7a, 7b are connected between the cathode terminals of the free-wheel diodes 5u, 5x and the anode terminals of the free-wheel diodes 5u, 5x.

The reverse voltage application circuits 7a, 7b are constituted by: a series connection of auxiliary power sources 12a, 12b having constant voltage DC power sources 8a, 8b of lower voltage than the DC voltage source 1; reverse voltage application switching elements 17a, 17b of lower voltage withstanding ability than the main circuit switching elements 4u, 4x; and high-speed auxiliary diodes 29a, 29b having a shorter reverse recovery time than the free-wheel diodes 5u, 5x. Gate drive signals g1a, g1b of the main circuit switching elements 4u, 4x are input through the base drive circuits 9a, 9b from the main circuit switching control circuit 30 to the gate terminals of the main circuit switching elements 4u, 4x. Also, gate drive signals g2a, g2b of the reverse voltage application switching elements 17 are input through the base drive circuits 18a, 18b from the reverse voltage application switching control circuit 31 to the gate terminals of the reverse voltage application switching elements 17a, 17b.

Figure 14:
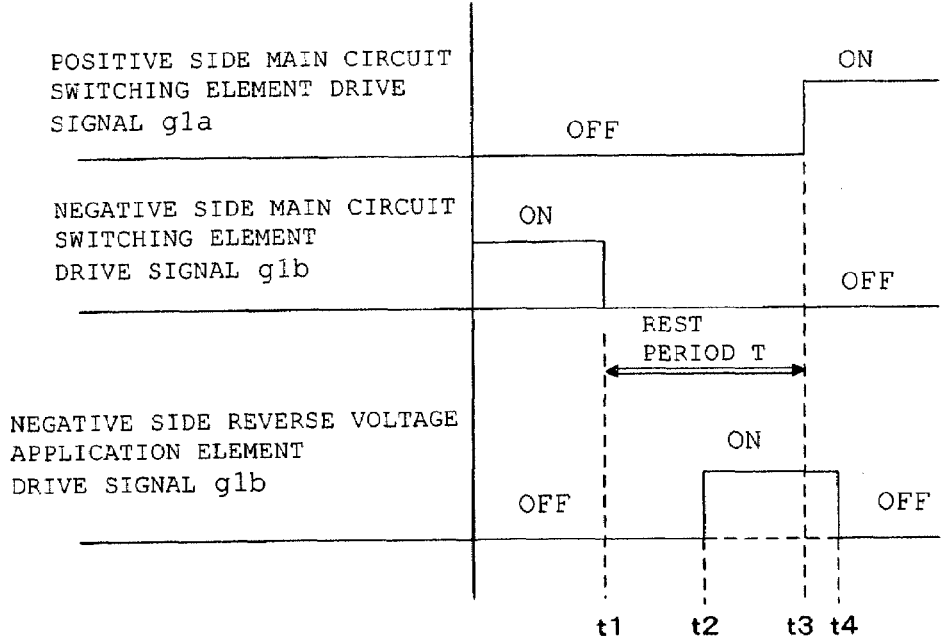
FIG. 14 is a diagram of a gate drive signal from a main circuit switching control circuit and a gate drive signal from a reverse voltage application switching control circuit in a sixth embodiment of the present invention.
Figure 1:
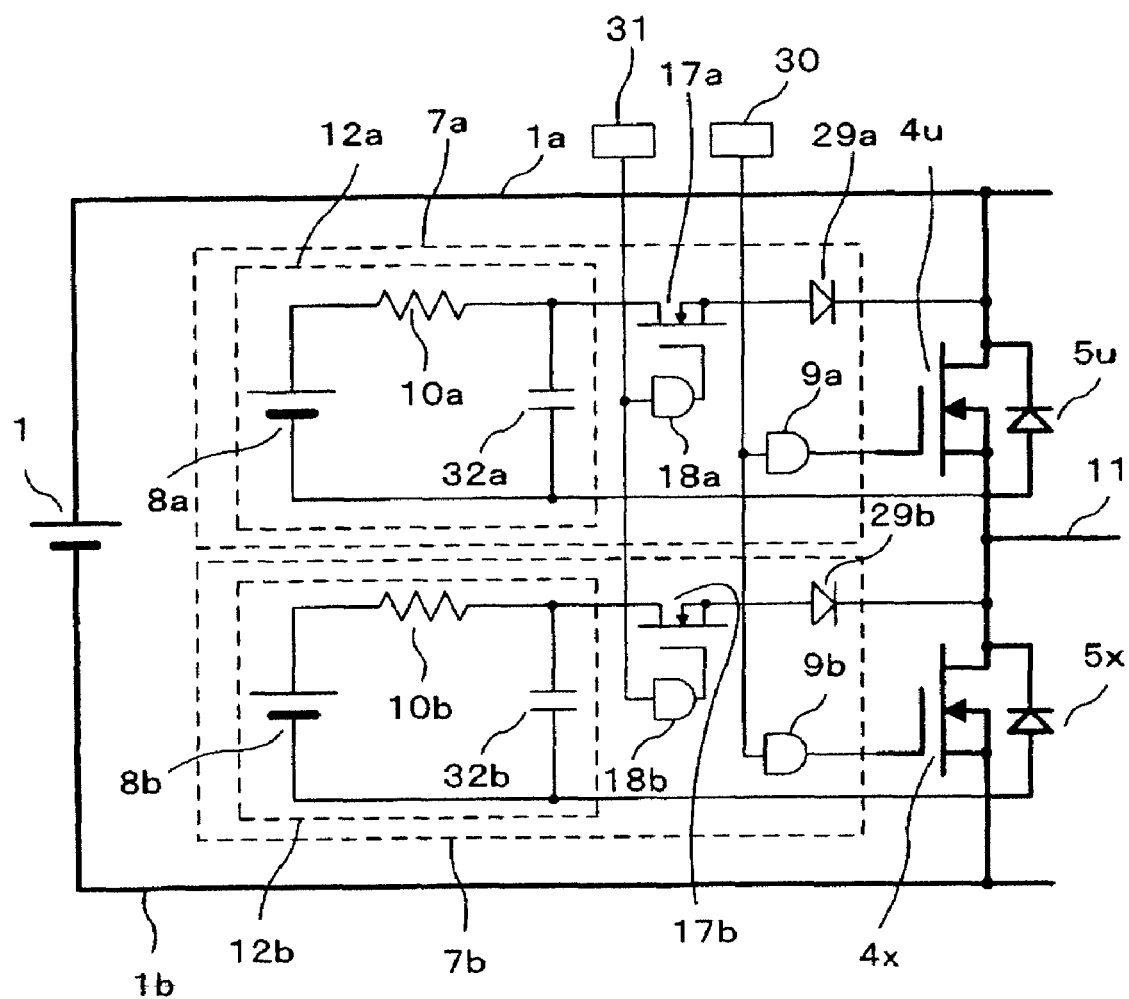

FIG. 14 is a diagram of the gate drive signals g1 from the main circuit switching control circuit 30 and the gate drive signals g2 from the reverse voltage application switching control circuit 31. The gate drive signal g1a is the gate drive signal that is input to the gate terminal of the positive side main circuit switching element 4u; the gate drive signal g1b is the gate drive signal that is input to the gate terminal of the negative side main circuit switching element 4x; and the gate drive signal g2b is the gate drive signal that is input to the gate terminal of the reverse voltage application switching elements 17.

In FIG. 14, in the rest period T after the gate drive signal g1b of the negative side main circuit switching element 4x has assumed an OFF instruction condition at the time point t1 until the gate drive signal g1a of the positive side main circuit switching element 4u assumes an ON instruction condition at the time point t3, the gate drive signal g2b of the negative side reverse voltage application switching element 17b is put in an ON instruction condition at the time point t2 and is put in an OFF instruction condition at the time point t4 after lapse of the rest period T. Also, although not shown in the Figure, similar ON/OFF timing is applied in respect of the gate drive signal g2a of the positive side reverse voltage application switching element 4u. Next, the operation will be described. The case where switching is effected from the condition in which the load terminal 11 is connected with the negative side DC bus 1b, to the condition in which the load terminal 11 is connected with the positive side DC bus 1a will be described. In this case, first of all, when the load current flows in from the load side to load terminal 11, when the gate drive signal g1b of the negative side main circuit switching element 4x is switched to the OFF instruction condition, immediately thereafter, the negative side main circuit switching element 4x is turned OFF, and, immediately, the load current flows into the positive side DC bus 1a through the positive side free-wheel diode 5u.

At this point, the potential condition of the load terminal 11 is a condition in which the load terminal 11 is connected with the positive side DC bus 1a. In this condition, the potential of the drain terminal of the negative side main circuit switching element 4x, and so the potential of the cathode terminal of the negative side auxiliary diode 29b also, is in a condition of connection with the positive side DC bus 1a. In contrast, the negative side constant voltage DC voltage source 8b has a voltage lower than that of the DC voltage source 1, so reverse voltage is applied to the negative side auxiliary diode 29b: thus, current cannot flow to the reverse voltage application circuit 7b, even when the negative side reverse voltage application switching element 17b is in an ON condition.

In this condition, if the timing with which the negative side reverse voltage application switching element 17b is put in ON condition is somewhat too early, the negative side main circuit switching element 4x may not have been turned completely OFF and short-circuiting may therefore occur through the auxiliary power source 12b. It is therefore desirable that even though the voltage is lower than that of the DC voltage source 1 excess loss should not be generated. Accordingly, the timing (time-point t2 of FIG. 14) with which the negative side reverse voltage application switching element 17 assumes the ON condition is made to be a timing later than the timing with which the negative side main circuit switching element 4x is turned completely OFF.

Next, at the time of outflow of the load current from the load terminal 11 to the load side, even if the gate drive signal g1b of the negative side main circuit switching element 4x is switched to the OFF instruction condition, the negative side free-wheel diode 5x continues to allow current to pass in the forwards direction. Consequently, the potential condition of the load terminal 11 still remains as a connection condition with the negative side DC bus 1b. In this condition, current is caused to flow from the low-voltage DC voltage source 8b of the auxiliary power source 12b by putting the negative side reverse voltage application switching element 17b in the ON condition, with no reverse voltage being applied to the negative side auxiliary diode 29b.

In this way, the negative side free-wheel diode 5x can be put in the OFF condition by inflow of reverse recovery current to the negative side free-wheel diode 5x from the reverse voltage application circuit 7b. Then, after the lapse of the rest period T, the positive side main circuit switching element 4u goes into the ON condition, whereupon the potential condition of the load terminal 11 assumes a condition of connection with the positive side DC bus 1a.

In this case, if the timing of putting the negative side reverse voltage application switching element 17b into the ON condition is too late, the time for the inflow of reverse recovery current to the negative side free-wheel diode 5b is insufficient and full reverse recovery of the negative side free-wheel diode 5b cannot be achieved. Accordingly, the timing of putting the negative side reverse voltage application switching element 17b into the ON condition is made to be a timing such as is capable of ensuring the necessary time for enabling reverse recovery of the negative side free-wheel diode 5x by the reverse recovery current from the reverse voltage application circuit 7b.

Thus the timing at which the reverse voltage application switching element 17 is put into the ON condition is problematical both if this timing is too early and if this timing is too late: the timing is therefore fixed with a view to achieving a balance of these. Also, by balancing these, the rest period T can be set to be fairly long.

With the sixth embodiment, the reverse voltage application circuit 7 can be made to operate appropriately with a uniform timing irrespective of the direction of the main circuit current (load current), so a detector or the like to detect the direction of the main circuit current is unnecessary, making it possible to simplify the control mechanism.

Seventh Embodiment

FIG. 15 is a circuit diagram of major parts of a reverse voltage application circuit 7 in a power conversion device according to a seventh embodiment. In this seventh embodiment, in comparison with the sixth embodiment shown in FIG. 13, the auxiliary power sources 12a, 12b are provided with: low-voltage DC voltage power sources 8a, 8b of lower voltage than the voltage of the DC voltage source 1; current suppression circuits 10a, 10b connected in series with the low-voltage DC voltage power sources 8a, 8b and that suppress the main circuit current flowing in the low-voltage DC voltage power sources 8a, 8b during reverse recovery of the free-wheel diode; and high frequency capacitors 32a, 32b of low internal impedance even in the high frequency band, connected in parallel with the series circuits of the low-voltage DC voltage power sources 8a, 8b and current suppression circuits 10a, 10b.

In FIG. 15, the auxiliary power sources 12a, 12b are constituted by series connection of: low-voltage DC voltage power sources 8a, 8b whose voltage is lower than about ¼ of the voltage of the DC voltage source 1; resistors constituting current suppression circuits 10a, 10b; and high frequency capacitors 32a, 32b of low internal impedance even in the high frequency band.

In this case, the high frequency capacitors 32a, 32b are not constructed by smoothing electrolytic capacitors but, instead, high frequency capacitors such as ceramic capacitors or film capacitors are employed. Also, for the resistors constituting the current suppression circuits 10a, 10b, there may be substituted wiring resistance such as for example copper foil pattern wiring resistance of a printed circuit board, or copper wire or copper sheet. Also, they may be replaced by a constant current circuit as shown in FIG. 6. In the layout of FIG. 15, the discharge path linking the high-frequency capacitors 32a, 32b, reverse voltage application switching elements 17a, 17b, auxiliary diodes 29a, 29b and free-wheel diodes 5u, 5x is wired to be as short as possible, so as to reduce impedance.

In the seventh embodiment constructed in this way, since high-frequency capacitors 32a, 32b of low internal impedance even in the high-frequency band are employed, charge discharge from these high-frequency capacitors 32a, 32b is performed at high speed, so the rise time of the current flowing when reverse recovery of the free-wheel diodes 5u, 5x is effected can be made short, and the maximum current can also be made high (large). The action of the current suppression circuits 10a, 10b is also assisted by the fact that a current of a more uniform waveform flows in the low-voltage DC voltage power sources 8a, 8b, rather than such an impulse-form current flowing directly in the low-voltage DC voltage power sources 8a, 8b.

According to the sixth embodiment, in addition to the benefits of the sixth embodiment, the current that is necessary for reverse recovery of the free-wheel diodes 5u, 5x can flow for a short time but there is no need to employ a long rest period, so for example deterioration of control quality (waveform deterioration) of the power conversion device generated by the rest periods can be suppressed. Also, during the period in which reverse recovery current is supplied to the free-wheel diodes 5u, 5x, the main circuit current (load current) also passes through the reverse voltage application circuit 7, also increasing the loss due to the main circuit current; it is therefore desirable that reverse recovery of the free-wheel diodes 5u, 5x should be finished as rapidly as possible and this demand can also be achieved. In addition, since the load on the low-voltage DC voltage power sources 8a, 8b is alleviated, the low-voltage DC voltage power sources 8a, 8b need only be low current capacity power sources, enabling internal generation of heat by the low-voltage DC voltage power sources 8a, 8b to be alleviated.

Eighth Embodiment

Figure 16:
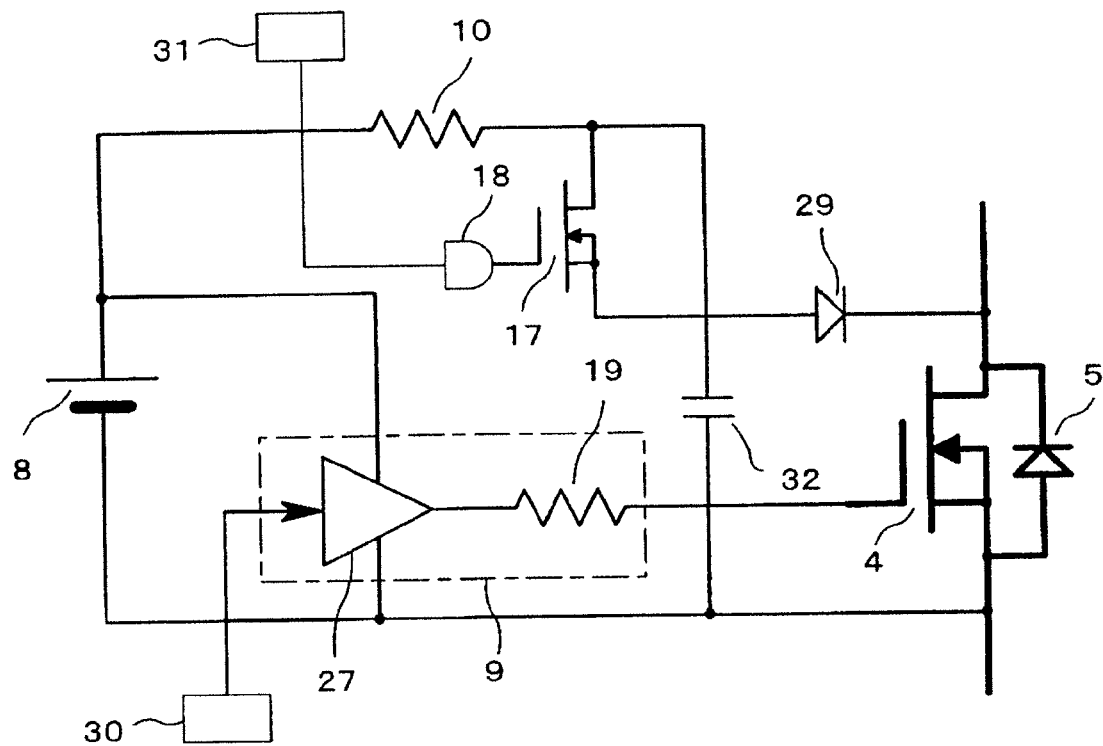
FIG. 16 is a circuit diagram of major parts of a reverse voltage application circuit in a power conversion device according to an eighth embodiment of the present invention.

FIG. 16 is a circuit diagram of major parts of a reverse voltage application circuit 7 in a power conversion device according to an eighth embodiment of the present invention. In this eighth embodiment, in comparison with the sixth embodiment, a low-voltage DC voltage power source 8 is employed as the drive power source of the main circuit switching element 4.

In FIG. 16, the base drive circuit 9 of the main circuit switching element 4 comprises a gate drive amplifier 27 and gate resistance 19; the gate drive amplifier 27 obtains power from the low-voltage DC voltage power source 8 and inputs this to the gate terminal of the main circuit switching element 4 as a gate drive signal of the main circuit switching element 4, through the gate resistance 19. FIG. 16 shows the case where a resistor is employed as the current suppression circuit 10. Also, the main circuit switching control circuit 30 controls on/off of the main circuit switching element 4 by outputting an ON/OFF instruction to the gate drive amplifier 27 of the base drive circuit 9, and the reverse voltage application switching control circuit 31 outputs an ON/OFF instruction to the reverse voltage application switching element 17 through the base drive circuit 18.

With the construction of FIG. 16, thanks to the current suppression action of the current suppression circuit 10 and the high frequency impedance reducing action of the high-frequency capacitor 32, no impulse-form current produced by reverse recovery flows to the free-wheel diode 5 from the low-voltage DC voltage power source 8, so voltage fluctuation of the low-voltage DC voltage power source 8 becomes extremely small even during reverse recovery of the free-wheel diode 5.

With this eighth embodiment, in addition to the benefits of the sixth embodiment, stabilization is effected by reducing voltage fluctuation of the low-voltage DC voltage power sources 8a, 8b, so even though power is supplied to the base drive circuit 9 of the main circuit switching element 4, adverse effects such as power source voltage fluctuations during reverse recovery of the free-wheel diode 5 can be prevented. Also, thanks to the power source sharing of the low-voltage DC voltage power source 8 and the power source of the base drive circuit 9, simplification of the circuit can be achieved.

Ninth Embodiment

Figure 17:
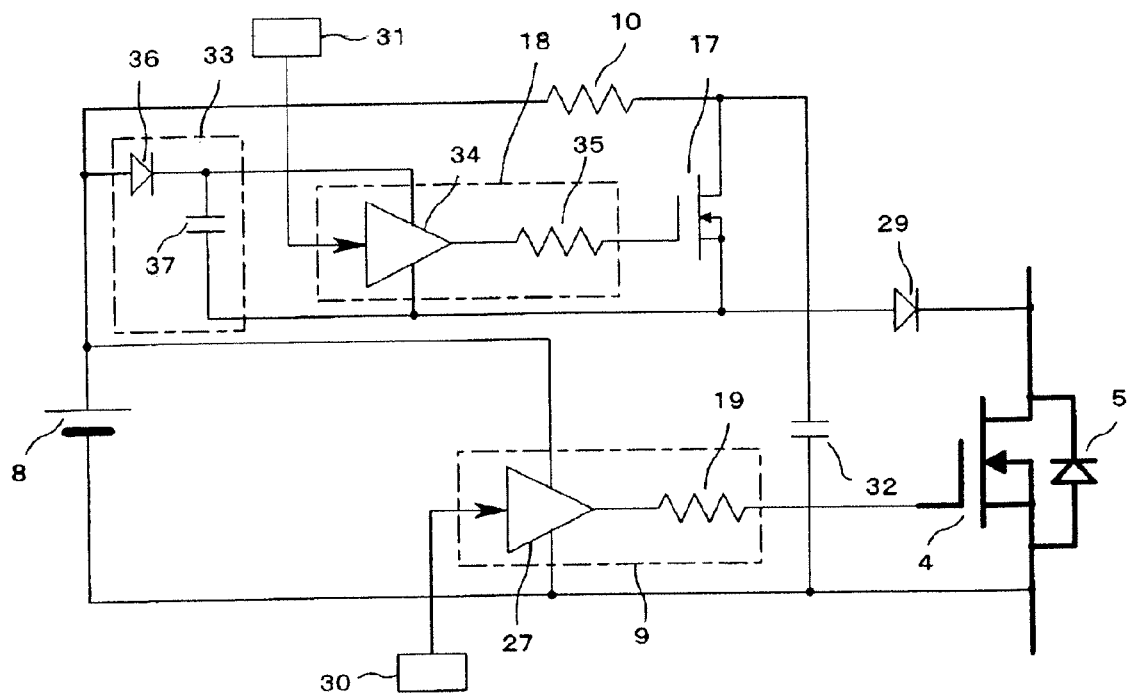
FIG. 17 is a circuit diagram of major parts of a reverse voltage application circuit in a power conversion device according to a ninth embodiment of the present invention.

FIG. 17 is a circuit diagram of major parts of a reverse voltage application circuit 7 in a power conversion device according to a ninth embodiment of the present invention. In comparison with the sixth embodiment, in this ninth embodiment, the drive power source of the reverse voltage application switching element 17 is arranged to be supplied by a bootstrap circuit 33 from the drive power source of the main circuit switching element 4.

In FIG. 17, the bootstrap circuit 18 of the reverse voltage application switching element 17 comprises a gate drive amplifier 34 and gate resistance 35; power is obtained by the bootstrap circuit 33 from the low-voltage DC voltage power source 8. The bootstrap circuit 33 comprises a bootstrap diode 36 and a bootstrap capacitor 37.

Also, in response to an instruction from the reverse voltage application switching control circuit 31, the bootstrap circuit 18 of the reverse voltage application switching element 17 obtains power by means of the bootstrap circuit 33 and outputs this to the gate terminal of the reverse voltage application switching element 17 as the gate drive signal of the reverse voltage application switching element 17.

In the period in which the main circuit switching element 4 is ON, or the period in which the free-wheel diode 5 is conducting, a negative electrode charging loop: positive terminal of the low-voltage DC voltage power source 8→bootstrap diode 36→bootstrap capacitor 37→auxiliary diode 29→main circuit switching element 4→low-voltage DC voltage power source 8 is formed, and the bootstrap capacitor 37 is thereby charged from the low-voltage DC voltage power source 8. The power that is charged on this bootstrap capacitor 37 is employed as the drive power source of the reverse voltage application switching element 17.

With this ninth embodiment, in addition to the benefits of the sixth embodiment, the power source of the base drive circuit 18 of the reverse voltage application switching element 17 can be obtained without providing a separate isolated power source, so circuit simplification can be achieved.

Tenth Embodiment

Figure 18:
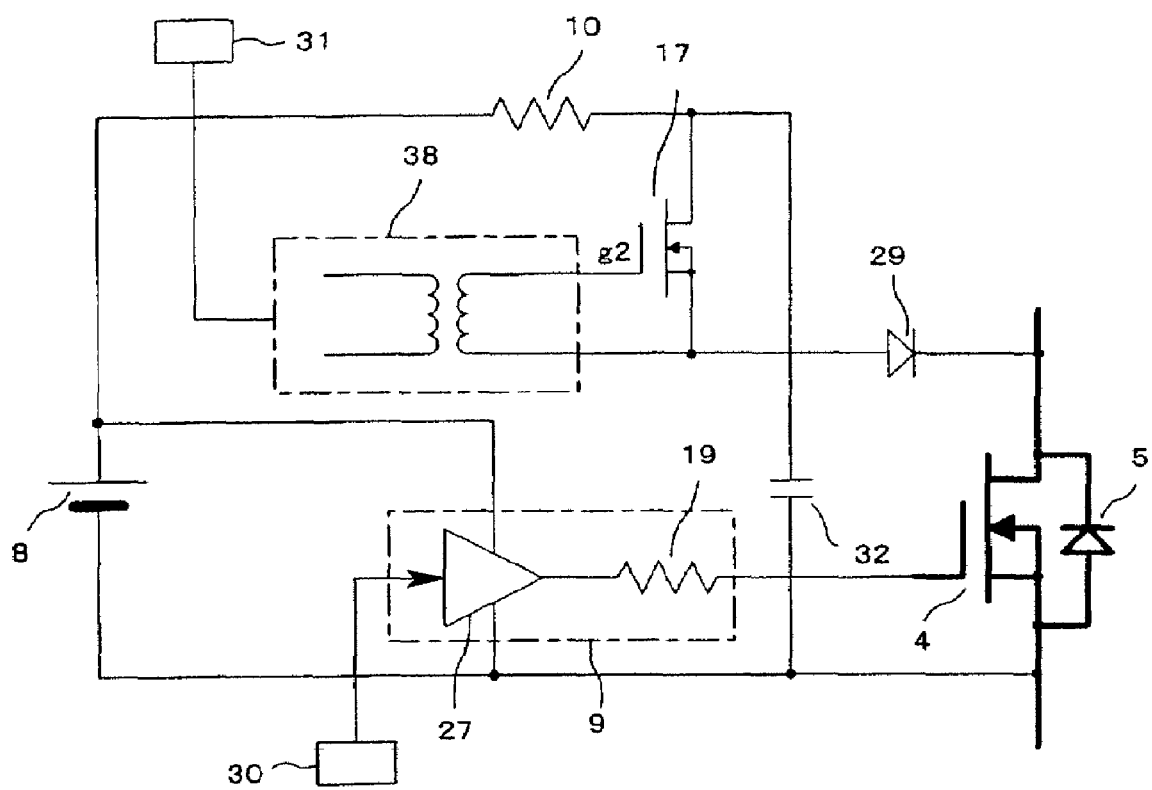
FIG. 18 is a circuit diagram of major parts of a reverse voltage application circuit in a power conversion device according to a tenth embodiment of the present invention.

FIG. 18 is a circuit diagram of major parts of a reverse voltage application circuit 7 in a power conversion device according to a tenth embodiment of the present invention. In comparison with the sixth embodiment, in this tenth embodiment, the drive signal of the reverse voltage application switching element 17 is supplied through a pulse transformer 38.

In FIG. 18, the reverse voltage application switching control circuit 31 supplies a gate drive signal to the reverse voltage application switching element 17 through the pulse transformer 38. The reverse voltage application switching element gate drive signal g2 drives the gate of the reverse voltage application switching element 17 while being isolated by the pulse transformer 38.

Since in this tenth embodiment, the gate drive signal can be isolated merely by a single pulse transformer 38, a dedicated power source for the gate drive amplifier is unnecessary. Consequently, drive can be achieved by the same power source as the gate drive signal of the other phases with a constant control potential, thereby making it possible to achieve circuit simplification.

Eleventh Embodiment

Figure 19:
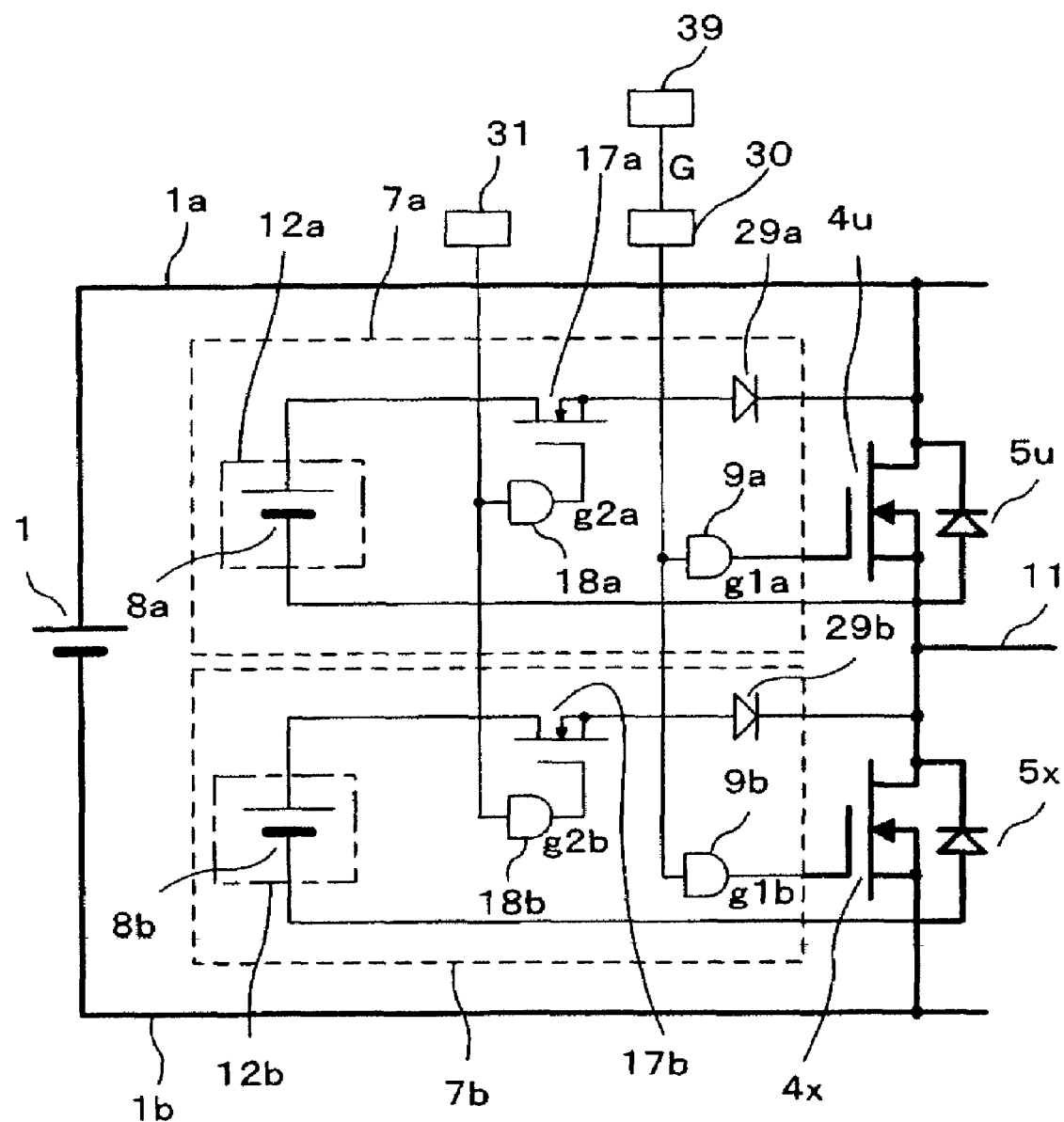
FIG. 19 is a circuit diagram of major parts of a reverse voltage application circuit in a power conversion device according to an eleventh embodiment of the present invention.

FIG. 19 is a circuit diagram of major parts of a reverse voltage application circuit 7 in a power conversion device according to an eleventh embodiment of the present invention. In this eleventh embodiment, in comparison with the sixth embodiment, the pulse width of the drive source signal G that is supplied to the main circuit switching elements 4u, 4x and that is output from the control circuit 39 is arranged to be longer than the short rest period for which both main circuit switching elements 4u, 4x are OFF.

The drive source signal G of the main circuit switching elements 4u, 4x that is generated from the control circuit 39 usually has a PWM waveform. The control circuit 39 outputs a drive source signal G whose pulse width is longer than the rest period for which both the main circuit switching elements 4u, 4x are turned OFF. This is in order to prevent pulse loss of the gate drive signal g1a of the positive side main circuit switching element 4u.

Figure 20A:
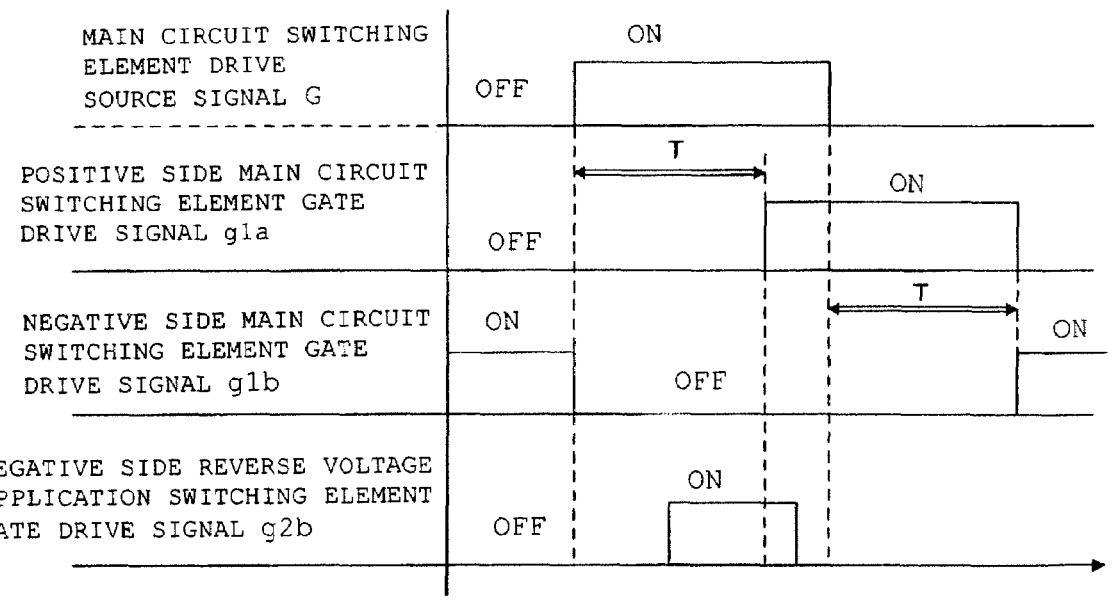
FIG. 20A and FIG. 20B are diagrams of pulse loss of a gate drive signal of a positive side main circuit switching element in an eleventh embodiment of the present invention.
Figure 20B:
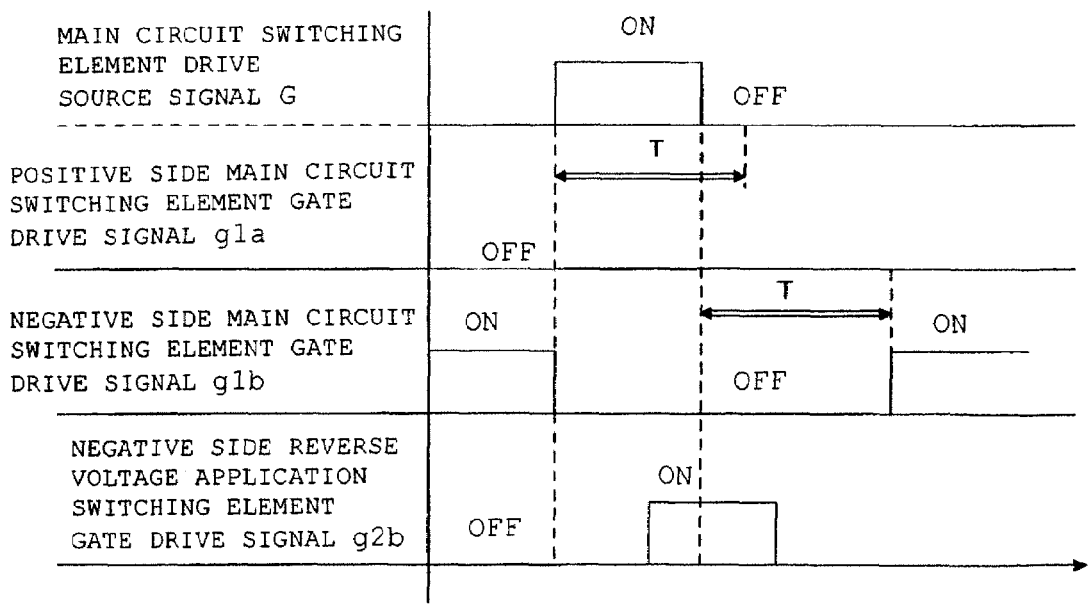

FIG. 20A and FIG. 20B are diagrams of pulse loss of the gate drive signal g1a of the positive side main circuit switching element 4u. As shown in FIG. 20A, the gate drive signal g1a of the positive side main circuit switching element 4u is formed as a signal wherein the rise time of the drive source signal G is delayed by the rest period T and the gate drive signal g1b of the negative side main circuit switching element 4x is formed as a signal wherein the rise time of the waveform obtained by inverting ON and OFF of the drive source signal G is delayed by the amount of the rest period.

In the gate drive signals g1a, g1b formed in this way, as shown in FIG. 20B, if the period of the ON condition of the drive source signal G is shorter than the rest period T, the ON condition of the gate drive signal g1a of the positive side main circuit switching element 4u disappears i.e. pulse loss occurs.

Normally, in the negative side reverse voltage application switching element 17b the current is automatically cut off by reverse biasing of the negative side auxiliary diode 29b by the turning ON of the positive side main circuit switching element 4u. However, when such pulse loss occurs, since the positive side main circuit switching element 4u is not ON, the negative side reverse voltage application switching element 4x is turned off by its own cut-off capability, so the switching loss and/or surge voltage during turn-off of the negative side reverse voltage application switching element 4x increases and, as a result, for the reverse voltage application switching element 17b, a high performance element must be selected. Accordingly, in the eleventh embodiment, it is arranged that pulses should not be emitted whose pulse width is narrower than this rest period.

In the eleventh embodiment, in addition to the benefits of the sixth embodiment, no drive source signal G of pulse width shorter than the rest period T is output by the control device 39, so pulse loss of the gate drive signal g1a of the positive side main circuit switching element 4u can be prevented. Consequently, by reverse biasing the auxiliary diode 29b, the current of the reverse voltage application switching element 17b is automatically cut off, with the result that it is no longer necessary to select an element of high performance for the reverse voltage application switching element 17b.

Twelfth Embodiment

Figure 21:
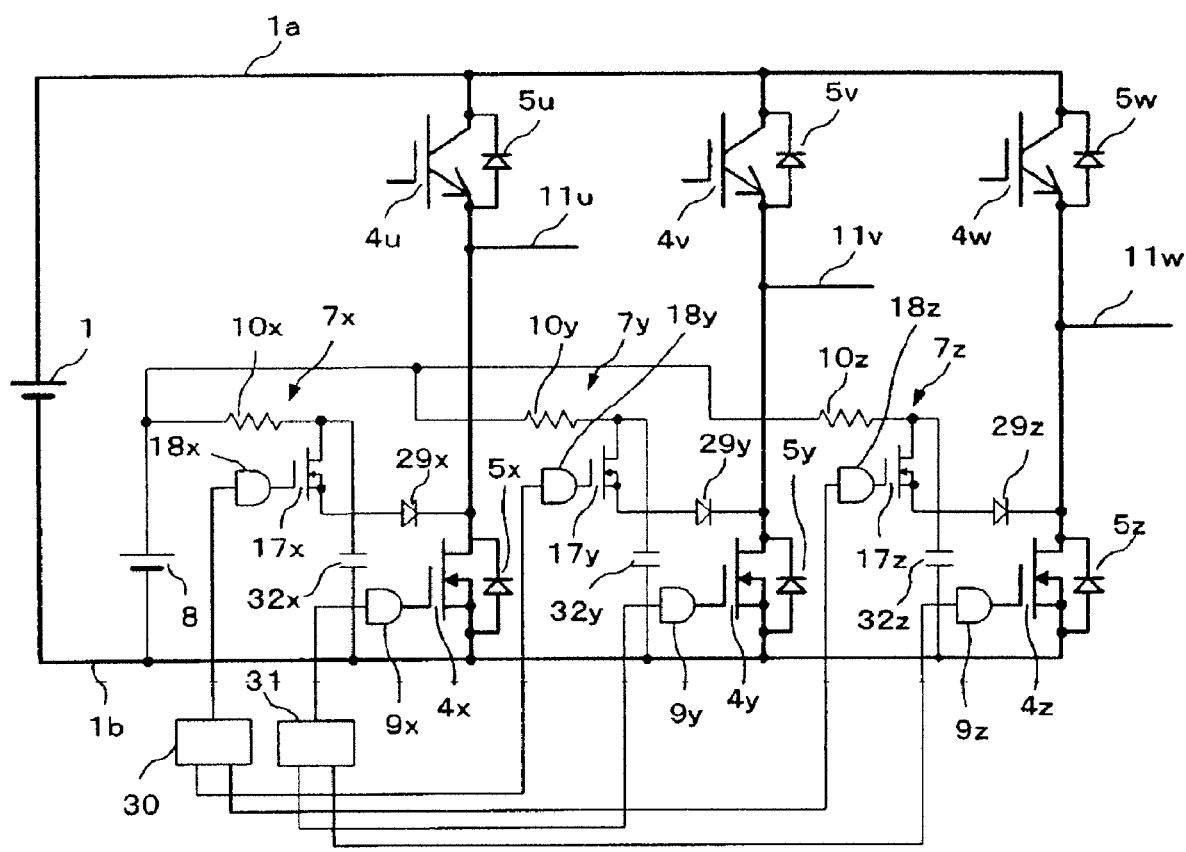
FIG. 21 is a circuit diagram of major parts of a reverse voltage application circuit in a power conversion device according to a twelfth embodiment of the present invention.

FIG. 21 is a circuit diagram of major parts of a reverse voltage application circuit 7 in the power conversion device according to a twelfth embodiment of the present invention. In this twelfth embodiment, compared with the sixth embodiment, of the sets of pairs of main circuit switching elements 4u to 4w, 4x to 4z, a reverse voltage application circuit 7 is only provided in respect of the main circuit switching elements 4x to 4z on the side that is connected with the negative side of the DC power source. FIG. 21 shows a power conversion device in the case where this is used as a three-phase inverter.

In FIG. 21, a positive side DC bus 1a and negative side DC bus 1b extend from the DC voltage source 1 and IGBTs are employed for the positive side main circuit switching elements 4u to 4w between the positive side DC bus 1a and negative side DC bus 1b: MOSFETs are employed for the negative side main circuit switching elements 4x to 4z.

While MOSFETs incorporating free-wheel diodes 5x to 5z are employed for the negative side main circuit switching elements 4x to 4z, IGBTs, that do not incorporate free-wheel diodes 5u to 5w, are employed for the positive side main circuit switching elements 4u to 4w; free-wheel diodes 5u to 5w which have a short reverse recovery time and little reverse recovery loss are therefore connected in parallel with the positive side main circuit switching elements 4u to 4w. Consequently, a reverse voltage application circuit 7 is not needed for the positive side main circuit switching elements 4u to 4w.

That is, although reverse voltage application circuits 7x to 7z are connected with the negative side main circuit switching elements 4x to 4z, no reverse voltage application circuit 7 is connected with the positive side main circuit switching element 4u. Only one low-voltage DC voltage power source 8 of the reverse voltage application circuits 7x to 7z of the negative side main circuit switching elements 4x to 4z is employed in common in a three-phase circuit. This is because the power line on one side of the reverse voltage application circuit 7 of the x phase to z phase can be shared with the negative side DC bus 1b of the DC voltage source 1.

In the twelfth embodiment, in addition to the benefits of the sixth embodiment, reverse voltage application circuits 7x to 7z are only employed for the negative side main circuit switching elements 4x to 4z, so it is not necessary to provide a low-voltage DC voltage power source 8 for each phase in the case where a three-phase circuit is employed, and a single low-voltage DC voltage power source 8 shared with all the phases is sufficient. Also, since only a single low-voltage DC voltage power source 8 is sufficient, circuit simplification can be achieved.

Thirteenth Embodiment

Figure 22:
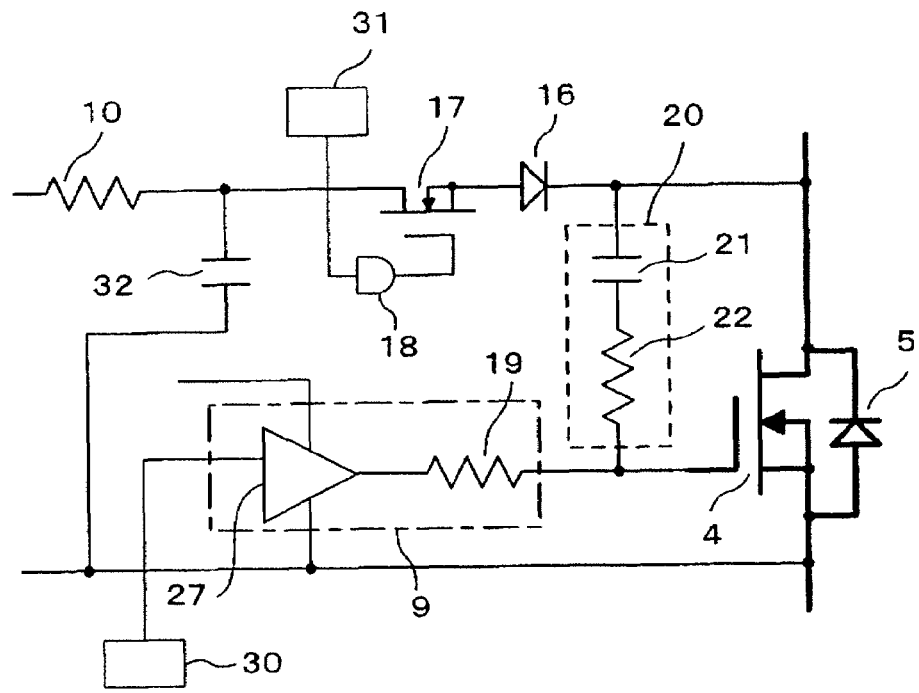
FIG. 22 is a circuit diagram of major parts of a reverse voltage application circuit in a power conversion device according to a thirteenth embodiment of the present invention.

FIG. 22 is a circuit diagram of major parts of a reverse voltage application circuit 7 in a power conversion device according to a thirteenth embodiment of the present invention. In this thirteenth embodiment, in comparison with the sixth embodiment, a voltage rate of change suppression circuit 20 is provided that regulates the voltage of the drive signal of the main circuit switching elements 4 such as to suppress abrupt time-wise variation of the output voltage of the main circuit switching elements 4.

In FIG. 22, the voltage rate of change suppression circuit 20 comprises a series connection of a voltage rate of change suppression capacitor 21 and a voltage rate of change suppression resistor 22 and is connected between the drain terminal of a main circuit switching element 4 and the gate terminal of a main circuit switching element 4.

In reverse recovery of the free-wheel diodes 5, the free-wheel diode 5 is abruptly turned OFF by the action of the reverse voltage application circuit 7. Consequently, the time-wise rate of change of the drain/source of voltage of the main circuit switching elements 4 becomes large. Accordingly, when the drain voltage of the main circuit switching element 4 commences to fall abruptly, the gate voltage of the main circuit switching element 4 is lowered by the action of the voltage rate of change suppression circuit 20, and, as a result, the rate of turning ON of the main switching element is moderated.

With this thirteenth embodiment, since, in addition to the benefits of the sixth embodiment, the rate of turning ON of the main switching element 4 is moderated, the rate of change in voltage of the main circuit switching element 4 is suppressed, thereby suppressing generation of electromagnetic interference (noise).

Fourteenth Embodiment

Figure 23:
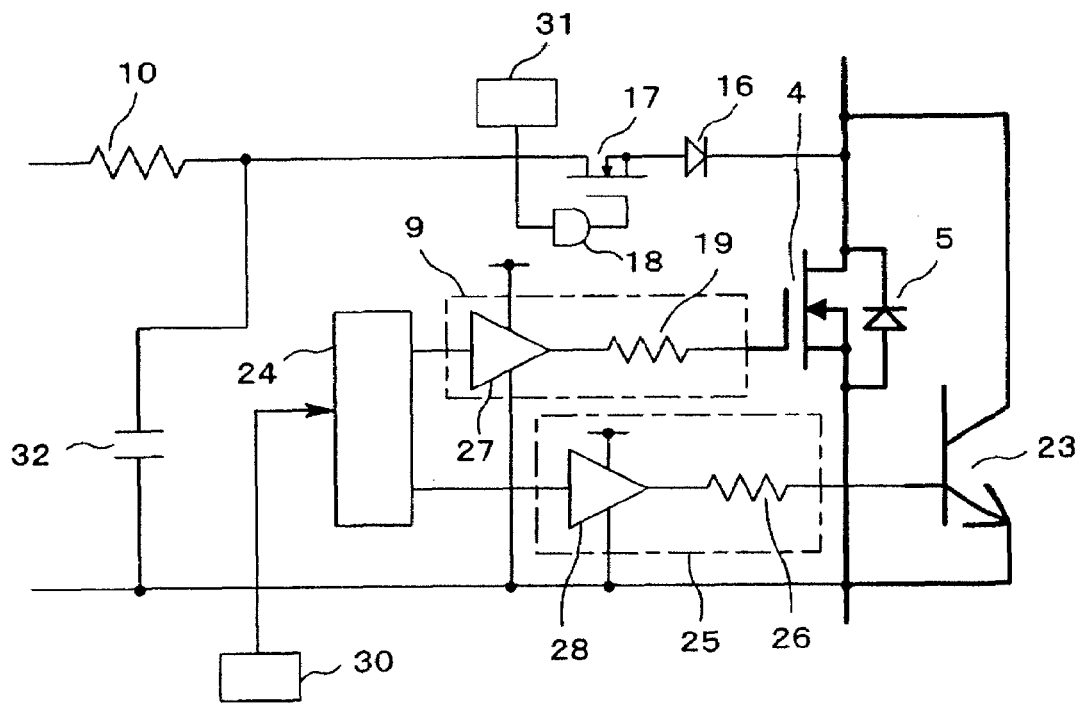
FIG. 23 is a circuit diagram of major parts of a reverse voltage application circuit in a power conversion device according to a fourteenth embodiment of the present invention.

FIG. 23 is a circuit diagram of major parts of a reverse voltage application circuit 7 in a power conversion device according to a fourteenth embodiment of the present invention. In comparison with the sixth embodiment, in this fourteenth embodiment, MOSFETs designed giving priority to low ON resistance are employed as the main circuit switching elements 4 and bipolar elements 23 are connected in parallel with the main circuit switching elements 4. These bipolar elements 23 are turned ON practically simultaneously with the main circuit switching elements 4, and are turned OFF somewhat earlier than the turning OFF of the main circuit switching elements 4.

In FIG. 23, the bipolar elements 23 are connected in parallel with the main circuit switching elements 4. A gate signal delay circuit 24 receives the original gate drive signal from the main circuit switching control circuit 30, and distributes this to the gate drive signal to the main circuit switching element 4 and the base drive signal to the bipolar element 23; the OFF timing of the gate drive signal of the main circuit switching element 4 is somewhat delayed from the OFF timing of the base drive signal of the bipolar element 23.

The gate drive signal to the main circuit switching element 4 is input to the main circuit switching element 4 through a gate drive amplifier 27 and gate resistance 19 of the base drive circuit 9. Likewise, the base drive signal to the bipolar element 23 is input to the bipolar element 23 through the gate drive amplifier 28 and gate resistance 26 of the base drive circuit 25.

As described above, FIG. 11 shows the gradient curve of the ON resistance and reverse recovery time of an ordinary power MOSFET element characteristic. This Figure displays the trend that, if the MOSFET is designed as such that the ON resistance is small, the reverse recovery time becomes long and, as a result, loss caused by reverse recovery becomes large; contrariwise, if the MOSFET is designed such that the ON resistance is large, the reverse recovery time becomes short and, as a result, loss caused by reverse recovery becomes small.

Accordingly, in the fourteenth embodiment, as the power MOSFETs that are used for the main circuit switching elements 4, power MOSFETs are employed that are designed giving priority to low ON resistance and bipolar elements 23 that turn ON practically simultaneously with the main circuit switching elements 4 but turn OFF somewhat earlier than the main circuit switching elements 4 turn OFF are connected in parallel therewith.

In this way, parallel operation with the bipolar elements 23 having an accumulation time can be achieved. Since considerable current flows in the low resistance bipolar elements 23 during the ON period, reduction of the ON losses can be achieved. Also, since the OFF timing of the bipolar elements 23 when turning OFF is somewhat early, the main circuit switching elements 4 turn OFF after the bipolar elements 23 having an accumulation time have completely turned OFF, so the turn-off losses can also be reduced.

With the fourteenth embodiment, the chip area of the power semiconductors can be reduced and the losses generated can be decreased, so a power conversion device of high efficiency and low cost can be realized.

INDUSTRIAL APPLICABILITY

With the present invention, thanks to the provision of a current suppression circuit that suppresses main circuit current flowing in the low-voltage DC voltage power source during reverse recovery of the free-wheel diodes, main circuit current flowing in the low-voltage DC voltage power source can be suppressed, and it becomes unnecessary to employ a constant voltage power source of large current capacity.

The main circuit current flowing to the reverse voltage application circuit during reverse recovery of the free-wheel diodes flows through a high-frequency capacitor of the reverse voltage application circuit, so the current required for reverse recovery of the free-wheel diode can flow in a short time, making it unnecessary to employ a longer rest period. Consequently, for example deterioration of control quality (waveform deterioration) of the power conversion device produced by this rest period can also be suppressed.

In addition, according to the present invention, the reverse voltage application circuit can be made to operate appropriately with a uniform timing irrespective of the direction of the main circuit current, so for example a detector to detect the direction of the current becomes unnecessary, making possible simplification of the control mechanism.

The invention claimed is:

1. A power conversion device comprising:
   (1) a set of pairs of main circuit switching elements that supply power to a load and are connected in series with a DC voltage source;
   (2) a free-wheel diode connected in anti-parallel with said main circuit switching element; and
   (3) a reverse voltage application circuit that applies reverse voltage smaller than said DC voltage source to said free-wheel diode on cut-off of said free-wheel diode, wherein said reverse voltage application circuit is constituted by a series circuit comprising: (a) an auxiliary power source of lower voltage than said DC voltage source; and
   (b) (i) a reverse voltage application switching element of lower voltage withstanding ability than said main circuit switching element, that is turned ON during reverse recovery of said free-wheel diode; and
   (ii) a high-speed auxiliary diode of shorter recovery time than said free-wheel diode; and
   wherein said auxiliary circuits comprise:
   (i) a low voltage DC voltage power source of lower voltage than a voltage of said DC voltage source;
   (ii) a current suppression circuit that suppresses said main circuit current flowing in said low-voltage DC voltage power source on reverse recovery of said free-wheel diode, and that is connected in series with said low-voltage DC voltage power source, and
   (iii) a high frequency capacitor of low internal impedance even in a high frequency band, connected in parallel with series circuit of a low-voltage DC voltage power source and said current suppression circuit;
   wherein, as said main circuit switching elements, MOSFETs designed giving priority to low ON resistance are employed, and bipolar elements that turn on practically simultaneously with said main circuit switching element but that turn OFF somewhat earlier than said main circuit switching element turn OFF are connected in parallel with said main circuit switching element.

2. The power conversion device according to claim 1, wherein said low-voltage DC voltage power source is employed as a drive power source of said main circuit switching element.

3. The power conversion device according to claim 1, wherein, of said set of pairs of main circuit switching elements, said reverse voltage application circuit is provided only for said main circuit switching elements on a side connected with a negative side of said DC power source.

4. The power conversion device according to claim 1, further comprising a voltage rate of change suppression circuit that regulates a voltage of a drive signal of said main circuit switching element, so as to suppress abrupt time-wise changes of an output voltage of said switching element.

* * * * *